(12) United States Patent
Kasada et al.

(10) Patent No.: US 12,040,002 B2
(45) Date of Patent: Jul. 16, 2024

(54) MAGNETIC TAPE CARTRIDGE AND MAGNETIC RECORDING AND REPRODUCING DEVICE

(71) Applicant: FUJIFILM Corporation, Tokyo (JP)

(72) Inventors: Norihito Kasada, Minamiashigara (JP); Yusuke Kaneko, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/730,348

(22) Filed: Apr. 27, 2022

(65) Prior Publication Data

US 2022/0351748 A1    Nov. 3, 2022

(30) Foreign Application Priority Data

Apr. 28, 2021 (JP) ................................. 2021-076853

(51) Int. Cl.
| | |
|---|---|
| *G11B 5/706* | (2006.01) |
| *G11B 5/592* | (2006.01) |
| *G11B 5/735* | (2006.01) |
| *G11B 15/43* | (2006.01) |
| *G11B 33/14* | (2006.01) |

(52) U.S. Cl.
CPC ........ *G11B 5/70678* (2013.01); *G11B 5/5928* (2013.01); *G11B 5/7356* (2019.05); *G11B 15/43* (2013.01); *G11B 33/14* (2013.01)

(58) Field of Classification Search
CPC .. G11B 5/68; G11B 5/70; G11B 5/706; G11B 5/7067; G11B 5/08; G11B 5/70652; G11B 5/735; G11B 5/06; G11B 5/7358; G11B 5/5928; G11B 33/14; G11B 15/43
See application file for complete search history.

(56) References Cited

U.S. PATENT DOCUMENTS

| | | | |
|---|---|---|---|
| 10,923,148 B2 | 2/2021 | Enomoto et al. | |
| 2019/0180781 A1* | 6/2019 | Handa | ................... G11B 5/012 |
| 2022/0165301 A1* | 5/2022 | Yamaga | ................... G11B 5/71 |

FOREIGN PATENT DOCUMENTS

JP            6590104 B1    10/2019

* cited by examiner

*Primary Examiner* — Holly Rickman
(74) *Attorney, Agent, or Firm* — Sughrue Mion, PLLC

(57) ABSTRACT

In the magnetic tape, a maximum value of magnetic tape deformation amounts after storage in each of five environments for 1 year is 0.50 μm or less, a rate of a change of magnetic tape deformation amount with respect to a change in relative humidity obtained from the five magnetic tape deformation amounts is 0.0001 μm/% to 0.0500 μm/%, and a rate of a change of the magnetic tape deformation amount with respect to a change in temperature obtained from the five magnetic tape deformation amounts is 0.0010 μm/° C. to 0.1000 μm/° C.

20 Claims, 4 Drawing Sheets

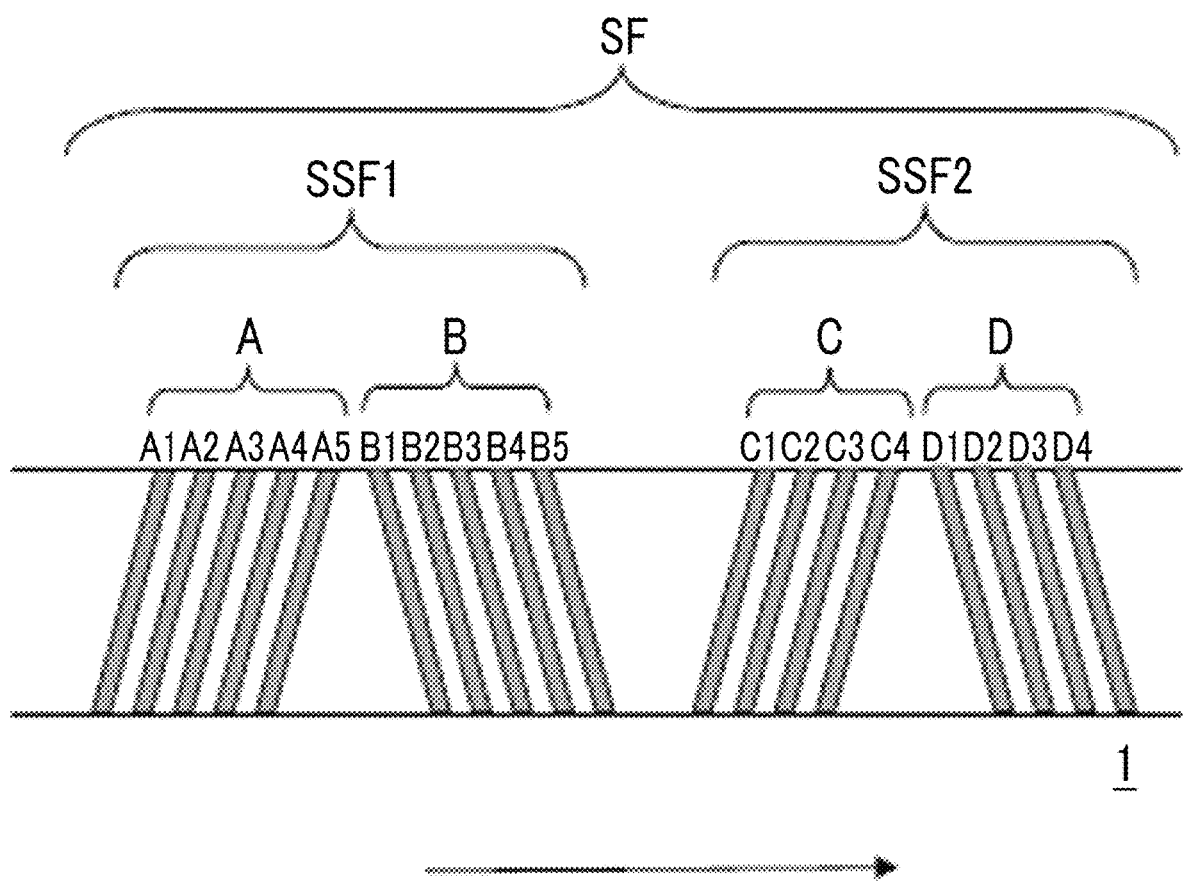

MAGNETIC TAPE CARTRIDGE AND MAGNETIC RECORDING AND REPRODUCING DEVICE

CROSS-REFERENCE TO RELATED APPLICATIONS

This application claims priority under 35 U.S.C 119 to Japanese Patent Application No. 2021-076853 filed on Apr. 28, 2021. The above application is hereby expressly incorporated by reference, in its entirety, into the present application.

BACKGROUND OF THE INVENTION

1. Field of the Invention

The present invention relates to a magnetic tape cartridge and a magnetic recording and reproducing device.

2. Description of the Related Art

Magnetic recording media are divided into tape-shaped magnetic recording media and disk-shaped magnetic recording media, and tape-shaped magnetic recording media, that is, magnetic tapes are mainly used for various data storage (for example, see JP6590104B).

SUMMARY OF THE INVENTION

The recording of data on a magnetic tape is normally performed by causing the magnetic tape to run in a magnetic recording and reproducing device (normally referred to as a "drive") and causing a magnetic head to follow a data band of the magnetic tape to record data on the data band. Accordingly, a data track is formed on the data band. In addition, in a case of reproducing the recorded data, the magnetic tape is caused to run in the magnetic recording and reproducing device and the magnetic head is caused to follow the data band of the magnetic tape, thereby reading data recorded on the data band. After such recording or reproducing, the magnetic tape is stored while being wound around a reel in a magnetic tape cartridge (hereinafter, referred to as a "cartridge reel"), until the next recording and/or reproducing is performed.

In order to increase an accuracy with which the magnetic head follows the data band of the magnetic tape in the recording and/or the reproducing, a system that performs head tracking using a servo signal (hereinafter, referred to as a "servo system") is practiced.

In addition, the dimension information of the magnetic tape in the width direction during the running can be obtained using a servo signal, and the dimension of the magnetic tape in the width direction can be controlled by adjusting the tension applied in the longitudinal direction of the magnetic tape according to the obtained dimension information (as an example, see paragraph 0170 and the like of JP6590104B). It is considered that the tension adjustment can contribute to suppressing the magnetic head for recording and reproducing the data from being deviated from a track position of a target track due to a width deformation of the magnetic tape during the recording and reproducing to cause occurrence of phenomena such as overwriting of the recorded data, reproducing failure, and the like. In addition, it is expected that, in a case where the magnetic tape is caused to run in the magnetic recording and reproducing device while performing such tension adjustment to record and/or reproduce data, the high running stability of the magnetic tape contributes to further suppression of the occurrence of the phenomenon described above.

In addition, curing the recording and/or the reproducing is performed after the storage, in a case where the magnetic head for recording and/or reproducing data records and/or reproduces data while being deviated from a target track position due to deformation of the magnetic tape, phenomenons such as overwriting on recorded data, reproducing failure, and the like may occur. Meanwhile, in recent years, in the field of data storage, there is an increasing need for long-term storage of data, which is called an archive. However, in general, as a storage period increases, the magnetic tape tends to be easily deformed. Therefore, it is expected that suppression of the occurrence of the above phenomenon after storage will be further required in the future.

In view According to one embodiment of the invention, an object is to enable recording and/or reproducing in an excellent manner during recording and/or reproducing of data with respect to the magnetic tape after accommodation and storage in a magnetic tape cartridge, and control the dimension of the magnetic tape in the width direction by adjusting the tension applied in the longitudinal direction of the magnetic tape to increase the running stability in a case of performing the recording and/or reproducing.

According to an aspect of the invention, there is provided a magnetic tape cartridge comprising: a magnetic tape which is wound around a cartridge reel and accommodated in the magnetic tape cartridge, in which the magnetic tape includes a non-magnetic support, and a magnetic layer containing a ferromagnetic powder, the magnetic layer includes a plurality of servo bands, a maximum value of the following five magnetic tape deformation amounts of a magnetic tape deformation amount after storage for 1 year in an environment of a temperature of 16° C. and relative humidity of 20%, a magnetic tape deformation amount after storage for 1 year in an environment of a temperature of 16° C. and relative humidity of 80%, a magnetic tape deformation amount after storage for 1 year in an environment of a temperature of 26° C. and relative humidity of 80%, a magnetic tape deformation amount after storage for 1 year in an environment of a temperature of 32° C. and relative humidity of 20%, and a magnetic tape deformation amount after storage for 1 year in an environment of a temperature of 32° C. and relative humidity of 55% (hereinafter, also referred to as a "magnetic tape maximum deformation amount after storage for 1 year in five environments") is 0.50 μm or less, a rate of a change in magnetic tape deformation amount with respect to a change in relative humidity, which is obtained from the five magnetic tape deformation amounts, is 0.0001 μm/% to 0.0500 μm/%, and a rate of a change in magnetic tape deformation amount with respect to a change in temperature, which is obtained from the five magnetic tape deformation amounts, is 0.0010 μm/° C. to 0.1000 μm/° C.

In one embodiment, the magnetic tape maximum deformation amount after storage for 1 year in five environments may be 0.01 μm to 0.50 μm.

In one embodiment, the magnetic tape may further include a non-magnetic layer containing a non-magnetic powder between the non-magnetic support and the magnetic layer.

In one embodiment, the magnetic tape may further include a back coating layer containing a non-magnetic powder, on a surface side of the non-magnetic support opposite to a surface side provided with the magnetic layer.

In one embodiment, the non-magnetic support may be an aromatic polyester support.

In one embodiment, the aromatic polyester support may be a polyethylene terephthalate support.

In one embodiment, the aromatic polyester support may be a polyethylene naphthalate support.

In one embodiment, the non-magnetic support may be an aromatic polyamide support.

In one embodiment, a vertical squareness ratio of the magnetic tape may be 0.60 or more.

According to another aspect of the invention, there is provided a magnetic recording and reproducing device comprising the magnetic tape cartridge.

In one embodiment, the magnetic recording and reproducing device may further comprise a magnetic head having a reproducing element width of 0.8 µm or less.

In one embodiment, the magnetic recording and reproducing device may further comprise: the magnetic tape cartridge; and a winding reel, in which the magnetic tape is caused to run between the winding reel and a cartridge reel of the magnetic tape cartridge in a state where a tension is applied in a longitudinal direction of the magnetic tape, where a maximum value of the tension is 0.50 N or more, and the magnetic tape after running in the state where the tension is applied is wound around the cartridge reel of the magnetic tape cartridge by applying a tension of 0.40 N or less in the longitudinal direction of the magnetic tape.

According to one aspect of the present invention, it is possible to enable recording and/or reproducing in an excellent manner during recording and/or reproducing of data with respect to the magnetic tape after accommodation and storage in a magnetic tape cartridge, and control the dimension of the magnetic tape in the width direction by adjusting the tension applied in the longitudinal direction of the magnetic tape to increase the running stability in a case of performing the recording and/or reproducing.

BRIEF DESCRIPTION OF THE DRAWINGS

FIG. 6 shows a servo pattern disposition example of a linear-tape-open (LTO) Ultrium format tape.

DESCRIPTION OF THE PREFERRED EMBODIMENTS

Figure 1:
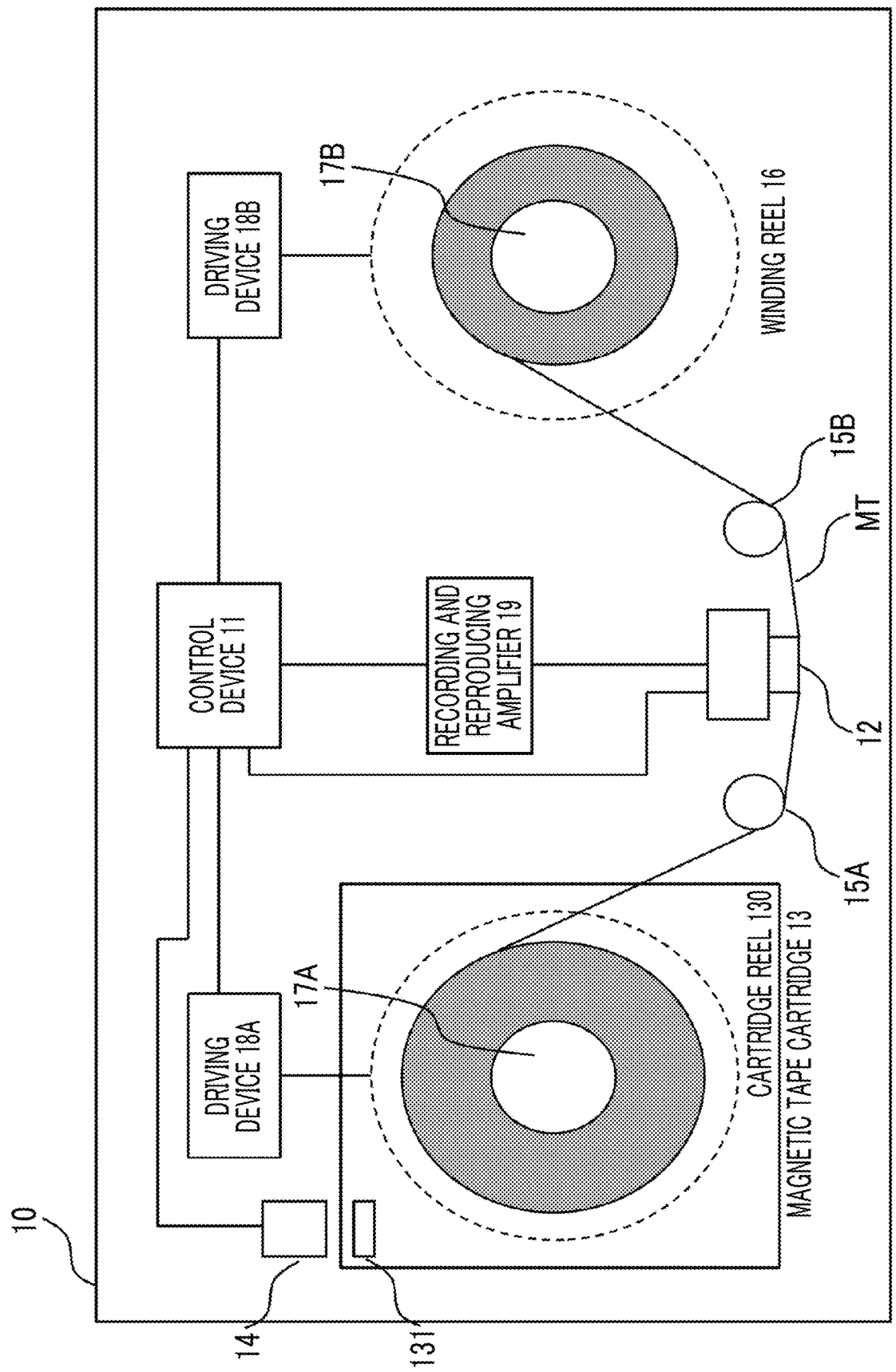
FIG. 1 is a schematic view showing an example of a magnetic recording and reproducing device.

One aspect of the present invention relates to the above magnetic tape cartridge.

In addition, another aspect of the invention relates to a magnetic recording and reproducing device including the above magnetic tape cartridge.

The magnetic tape cartridge includes a magnetic tape and a cartridge reel. In an unused magnetic tape cartridge that has not yet been attached to a magnetic recording and reproducing device for data recording and/or reproducing, the magnetic tape is typically accommodated while being wound around a cartridge reel. In the magnetic recording and reproducing device, the magnetic tape can run between the cartridge reel (supply reel) and the winding reel to record data on the magnetic tape and/or reproduce the recorded data. After the recording or reproducing of data, the magnetic tape is rewound around the cartridge reel, and stored while being wound around the cartridge reel in the magnetic tape cartridge, until the next recording and/or reproducing is performed.

It is surmised that different deformations occur depending on the position such that, during the storage, in the magnetic tape accommodated in the magnetic tape cartridge, a part near the cartridge reel is deformed wider than the initial stage due to compressive stress in a tape thickness direction, and a part far from the cartridge reel is deformed narrower than the initial stage due to the tensile stress in the tape longitudinal direction. It is considered that, in a case where the significant different deformations occur depending on the position, this may cause the magnetic head to record and/or reproduce data while being deviated from the target track position, in a case where the recording and/or the reproducing is performed after storage.

During the intensive studies of the inventors, the inventors considered that enabling the recording and/or reproducing in an excellent manner coincides needs of users expected in the future in the data recording and/or reproducing of data with respect to the magnetic tape after accommodation in the magnetic tape cartridge and storage in various storage environments at least for 1 year. Therefore, the present inventors conducted further intensive studies to meet such needs and to control the dimension of the magnetic tape in the width direction by adjusting the tension applied in the longitudinal direction of the magnetic tape to increase the running stability in a case of performing the recording and/or reproducing. As a result, the inventors considered to control the magnetic tape maximum deformation amount after storage in five environments for 1 year, the rate of the change in magnetic tape deformation amount with respect to the change in relative humidity, and the rate of the change in magnetic tape deformation amount with respect to the temperature to be in the ranges described above.

Hereinafter, the magnetic tape cartridge and the magnetic recording and reproducing device will be described more specifically. Hereinafter, one embodiment of the magnetic tape cartridge and the magnetic recording and reproducing device may be described with reference to the drawings. However, the magnetic tape cartridge and the magnetic recording and reproducing device are not limited to the embodiment shown in the drawings. In addition, the present invention is not limited to the inference of the inventors described in the present specification.

Magnetic Tape Maximum Deformation Amount After Storage in Five Environments for 1 Year Hereinafter, a method for measuring the magnetic tape maximum deformation amount after storage in five environments for 1 year will be described.

The five environments are an "environment of a temperature of 16° C. and relative humidity of 20%", an "environment of a temperature of 16° C. and relative humidity of 80% environment", an "environment of a temperature of 26° C. and relative humidity of 80%", an "environment of a temperature of 32° C. and relative humidity of 20%", and an "environment of a temperature of 32° C. and relative humidity of 55%".

The magnetic tape deformation amount after storage in each environment for 1 year is obtained by the following method.

First, the following measurement regarding the dimensions of the magnetic tape before storage is performed before being sequentially stored in the five environments.

The magnetic tape cartridge to be measured is placed in an environment of an atmosphere temperature of 23° C. and a relative humidity of 50% for 5 days in order to make the magnetic tape familiar with the environment for measurement.

After that, in the measurement environment, in a magnetic recording and reproducing device including a tension adjusting mechanism for applying a tension in the longitudinal direction of the magnetic tape, the magnetic tape is allowed to run in a state where a tension of 0.70 N is applied in the longitudinal direction of the magnetic tape. For such running, the spacing between two servo bands adjacent to each other with a data band interposed therebetween is measured at spacing of 1 m over the entire length of the magnetic tape. In various measurements described in the invention and the specification, a value of the tension applied in the longitudinal direction of the magnetic tape is a set value set in the magnetic recording and reproducing device. In addition, in the invention and the specification, to describe "measurement at spacing of 1 m", in a measurement target region having a length of L meters (m), in a case where a length of a position of one end of the measurement target region is set to 0 m and a length of each position in a direction facing the other end is set to 1 m, 2 m, 3 m, . . . , and a length of a position of the other end is set to L m, an initial measurement position is a position of 1 m and a final measurement position is one position before the position of L m. In addition, in a case where there are a plurality of servo band spacings, the servo band spacing is measured in the same manner for all servo band spacings. The servo band spacing measured in this way is referred to as a "servo band spacing before storage" at each measurement position.

Then, the magnetic tape cartridge is stored in any environment of the five environments for 1 year. 1 year regarding the storage period is 365 days.

After the storage, after the magnetic tape cartridge is left in the measurement environment of an atmosphere temperature of 23° C. and a relative humidity of 50% for 5 days, in the same measurement environment, in a magnetic recording and reproducing device including a tension adjusting mechanism for applying a tension in the longitudinal direction of the magnetic tape, the magnetic tape is allowed to run in a state where a tension of 0.70 N is applied in the longitudinal direction of the magnetic tape. For such running, the servo band spacing is measured in the same manner as in the method described above. The servo band spacing measured in this way is referred to as a "servo band spacing after storage" at each measurement position.

For the all servo band spacing, a difference between the servo band spacing before the storage and the servo band spacing after the storage measured at spacing of 1 m is obtained. By doing so, a plurality of difference values are obtained. The maximum value of the absolute value of the obtained difference is set as the magnetic tape deformation amount of the magnetic tape cartridge to be measured after storage in each environment for 1 year.

The spacing between two servo bands adjacent to each other with the data band interposed therebetween can be obtained by using, for example, a position error signal (PES) obtained from a servo signal obtained by reading a servo pattern with a servo signal reading element. For details, the description of examples which will be described later can be referred to.

The magnetic tape cartridge to be measured is sequentially placed in any of the five environments and stored for 1 year, and then the magnetic tape deformation amount is measured by the method described above. In the five environments, the storage order of magnetic tape cartridges is not limited. The measurement is performed after storage in each environment sequentially in a random order. The maximum value of the five values of the magnetic tape deformation amount obtained in the five environments is defined as the magnetic tape maximum deformation amount after storage in the five environments for 1 year. The various measurement environments described above are examples, and the magnetic tape cartridges are not limited to those stored and/or used in the exemplified environment.

The magnetic tape maximum deformation amount of the magnetic tape cartridge after storage in five environments for 1 year is 0.50 μm or less, preferably 0.40 μm or less, more preferably 0.30 μm or less, even more preferably 0.20 μm or less, and still preferably 0.10 μm or less, from a viewpoint of enabling recording and/or reproducing in an excellent manner during recording and/or reproducing of data with respect to the magnetic tape after accommodation and storage in a magnetic tape cartridge. In addition, t magnetic tape maximum deformation amount of the magnetic tape cartridge after storage in five environments for 1 year can be, for example, 0.00 μm or more, more than 0.00 μm, 0.01 μm or more, 0.05 μm or more, or 0.10 μm or more. The smaller value of the magnetic tape maximum deformation amount after storage in five environments for 1 year is preferable, from a viewpoint of performing recording and/or reproducing in an excellent manner during recording and/or reproducing of data with respect to the magnetic tape after accommodation and storage in the magnetic tape cartridge.

Rate of Change in Magnetic Tape Deformation Amount with Respect to Change in Relative Humidity The rate of change in the magnetic tape deformation amount with respect to the change in relative humidity of the magnetic tape cartridge is an inclination a obtained by the least squares method by setting the magnetic tape deformation amount as y of a linear function of y=ax+b (a is an inclination and b is piece) and the relative humidity in the environment in which the magnetic tape deformation amount is obtained as x, regarding the values of the five magnetic tape deformation amounts obtained in five environments by the above method.

The rate of the change in the magnetic tape deformation amount with respect to the change in relative humidity of the magnetic tape cartridge is 0.0500 μm/% or less, preferably 0.0300 μm/% or less, and more preferably 0.0100 μm/% or less, from a viewpoint of enabling recording and/or reproducing in an excellent manner during recording and/or reproducing of data with respect to the magnetic tape after accommodation and storage in a magnetic tape cartridge. Meanwhile, from a viewpoint of controlling the dimension of the magnetic tape in the width direction by adjusting the tension applied in the longitudinal direction of the magnetic tape to increase the running stability in a case of performing the recording and/or reproducing (hereinafter also referred to as a "running stability"), the rate of the change in the magnetic tape deformation amount with respect to the change in relative humidity of the magnetic tape cartridge is 0.0001 μm/% or more, preferably 0.0005 μm/% or more, more preferably 0.0010 μm/% or more, and even more preferably 0.0050 μm/% or more.

Rate of Change in Magnetic Tape Deformation Amount with Respect to Change in Temperature The rate of change in the magnetic tape deformation amount with respect to the change in temperature of the magnetic tape cartridge is an inclination c obtained by the least squares method by setting y of a linear function of y=cx+d (c is an inclination and d is piece) as the magnetic tape deformation amount and the temperature in the environment in which the magnetic tape deformation amount is obtained as x, regarding the values of the five magnetic tape deformation amounts obtained in five environments by the above method.

The rate of the change in the magnetic tape deformation amount with respect to the change in temperature of the magnetic tape cartridge is 0.1000 μm/° C. or less, preferably 0.0700 μm/° C. or less, and more preferably 0.0500 μm/° C. or less, from a viewpoint of enabling recording and/or reproducing in an excellent manner during recording and/or reproducing of data with respect to the magnetic tape after accommodation and storage in a magnetic tape cartridge. Meanwhile, from a viewpoint of increasing the running stability, the rate of the change in the magnetic tape deformation amount with respect to the change in temperature of the magnetic tape cartridge is 0.0010 μm/° C. or higher, preferably 0.0050 μm/° C. or higher, more preferably 0.0070 μm/° C. or higher, and even more preferably 0.0100 μm/° C. or higher.

A controlling method of the various values described above will be described later.

Configuration of Magnetic Recording and Reproducing Device

FIG. 1 is a schematic view showing an example of a magnetic recording and reproducing device.

A magnetic recording and reproducing device 10 shown in FIG. 1 controls a recording and reproducing head unit 12 in accordance with a command from a control device 11 to record and reproduce data on a magnetic tape MT.

The magnetic recording and reproducing device 10 has a configuration of detecting and adjusting a tension applied in a longitudinal direction of the magnetic tape from spindle motors 17A and 17B and driving devices 18A and 18B which rotatably control a cartridge reel 130 and a winding reel 16.

The magnetic recording and reproducing device 10 has a configuration in which the magnetic tape cartridge 13 can be mounted.

The magnetic recording and reproducing device 10 includes a cartridge memory read and write device 14 capable of performing reading and writing with respect to the cartridge memory 131 in the magnetic tape cartridge 13.

An end portion or a leader pin of the magnetic tape MT is pulled out from the magnetic tape cartridge 13 mounted on the magnetic recording and reproducing device 10 by an automatic loading mechanism or manually and passes on a recording and reproducing head through guide rollers 15A and 15B in the direction in which a surface of a magnetic layer of the magnetic tape MT comes into contact with a surface of the recording and reproducing head of the recording and reproducing head unit 12, and accordingly, the magnetic tape MT is wound around the winding reel 16.

The rotation and torque of the spindle motor 17A and the spindle motor 17B are controlled by a signal from the control device 11, and the magnetic tape MT runs at random speed and tension. A servo pattern previously formed on the magnetic tape can be used to control the tape speed. A tension detection mechanism may be provided between the magnetic tape cartridge 13 and the winding reel 16 to detect the tension. The tension may be adjusted by using the guide rollers 15A and 15B in addition to the control by the spindle motors 17A and 17B.

The cartridge memory read and write device 14 is configured to be able to read and write information of the cartridge memory 131 according to commands from the control device 11. As a communication system between the cartridge memory read and write device 14 and the cartridge memory 131, for example, an international organization for standardization (ISO) 14443 system can be used.

The control device 11 includes, for example, a controller, a storage unit, a communication unit, and the like.

The recording and reproducing head unit 12 is composed of, for example, a recording and reproducing head, a servo tracking actuator for adjusting a position of the recording and reproducing head in a track width direction, a recording and reproducing amplifier 19, a connector cable for connecting to the control device 11. The recording and reproducing head is composed of, for example, a recording element for recording data on a magnetic tape, a reproducing element for reproducing data of the magnetic tape, and a servo signal reading element for reading a servo signal recorded on the magnetic tape. For example, one or more of each of the recording elements, the reproducing element, and the servo signal reading element are mounted in one magnetic head. Alternatively, each element may be separately provided in a plurality of magnetic heads according to a running direction of the magnetic tape.

The recording and reproducing head unit 12 is configured to be able to record data on the magnetic tape MT according to a command from the control device 11. In addition, the data recorded on the magnetic tape MT can be reproduced according to a command from the control device 11.

The control device 11 has a mechanism of controlling the servo tracking actuator so as to obtain a running position of the magnetic tape from a servo signal read from a servo band during the running of the magnetic tape MT and position the recording element and/or the reproducing element at a target running position (track position). The control of the track position is performed by feedback control, for example. The control device 11 has a mechanism of obtaining a servo band spacing from servo signals read from two adjacent servo bands during the running of the magnetic tape MT. The control device has a mechanism of adjusting and changing the tension applied in the longitudinal direction of the magnetic tape by controlling the torque of the spindle motor 17A and the spindle motor 17B and/or the guide rollers 15A and 15B so that the servo band spacing becomes a target value. The adjustment of the tension is performed by feedback control, for example. In addition, the control device 11 can store the obtained information of the servo band spacing in the storage unit inside the control device 11, the cartridge memory 131, an external connection device, and the like.

In the magnetic recording and reproducing device, the tension can be applied in the longitudinal direction of the magnetic tape during the recording and/or reproducing. In the above magnetic recording and reproducing device, the tension applied in the longitudinal direction of the magnetic tape during the recording and/or reproducing is a constant value in one embodiment and changes in another embodiment. Regarding the tension in the invention and this specification, in the magnetic recording and reproducing device, the value of the tension applied in the longitudinal direction of the magnetic tape is a value of a tension used for controlling a mechanism in which the control device of the magnetic recording and reproducing device adjusts the tension as the tension to be applied in the longitudinal direction of the magnetic tape. As described above, the tension actually applied in the longitudinal direction of the magnetic tape in the magnetic recording and reproducing device can be detected by, for example, providing a tension detection mechanism between the magnetic tape cartridge 13 and the winding reel 16 in FIG. 1. In addition, for example, the tension can also be controlled by the control device or the like of the magnetic recording and reproducing device so that a minimum tension is not less than a value determined by a standard or a recommended value and/or a maximum tension is not greater than a value determined by a standard or a recommended value.

In one embodiment, the magnetic recording and reproducing device may include a tension adjusting mechanism which adjusts a tension applied in a longitudinal direction of the magnetic tape which runs in the magnetic recording and reproducing device. The tension adjusting mechanism can control the tension applied in the longitudinal direction of the magnetic tape to be variable, and preferably, can control a dimension in the width direction of the magnetic tape by adjusting the tension applied in the longitudinal direction of the magnetic tape. In the tension adjustment, the tension applied in the longitudinal direction of the magnetic tape can be changed. An example of the magnetic recording and reproducing device having the tension adjusting mechanism is as described above with reference to FIG. 1. However, the invention is not limited to the example shown in FIG. 1.

Magnetic Tape Cartridge

In the magnetic tape cartridge before being mounted on the magnetic recording and reproducing device and after being taken out from the magnetic recording and reproducing device, the magnetic tape is generally wound around the cartridge reel and is accommodated in a cartridge main body. The cartridge reel is rotatably comprised in the cartridge main body. As the magnetic tape cartridge, a single reel type magnetic tape cartridge including one reel in a cartridge main body and a twin reel type magnetic tape cartridge including two reels in a cartridge main body are widely used. The magnetic tape cartridge can be a single reel type magnetic tape cartridge in one embodiment, and can be a twin reel type magnetic tape cartridge in another embodiment. Regarding the twin reel type magnetic tape cartridge, the cartridge reel refers to a reel on which the magnetic tape is mainly wound, in a case where the magnetic tape is stored after recording and/or reproducing data, and the other reel may refer to a winding reel. In a case where the single reel type magnetic tape cartridge is mounted in the magnetic recording and reproducing device in order to record and/or reproduce data on the magnetic tape, the magnetic tape is drawn from the magnetic tape cartridge and wound around the winding reel on the magnetic recording and reproducing device, for example, as shown in FIG. 1. A magnetic head is disposed on a magnetic tape transportation path from the magnetic tape cartridge to a winding reel. The magnetic tape runs by feeding and winding the magnetic tape between the cartridge reel (also referred to as a "supply reel") on the magnetic tape cartridge and the winding reel on the magnetic recording and reproducing device. In the meantime, for example, the magnetic head comes into contact with and slides on the surface of the magnetic layer of the magnetic tape, and accordingly, the recording and/or reproducing of data is performed. With respect to this, in the twin reel type magnetic tape cartridge, both reels of the supply reel and the winding reel are provided in the magnetic tape cartridge. In one embodiment, the magnetic tape cartridge is preferably a single reel type magnetic tape cartridge that has been mainly adopted in recent years in the field of data storage.

In one embodiment, the magnetic tape cartridge can include a cartridge memory. The cartridge memory can be, for example, a non-volatile memory, and tension adjustment information is recorded in advance or tension adjustment information is recorded. The tension adjustment information is information for adjusting the tension applied in the longitudinal direction of the magnetic tape. Regarding the cartridge memory, the above description can also be referred to.

Figure 2:
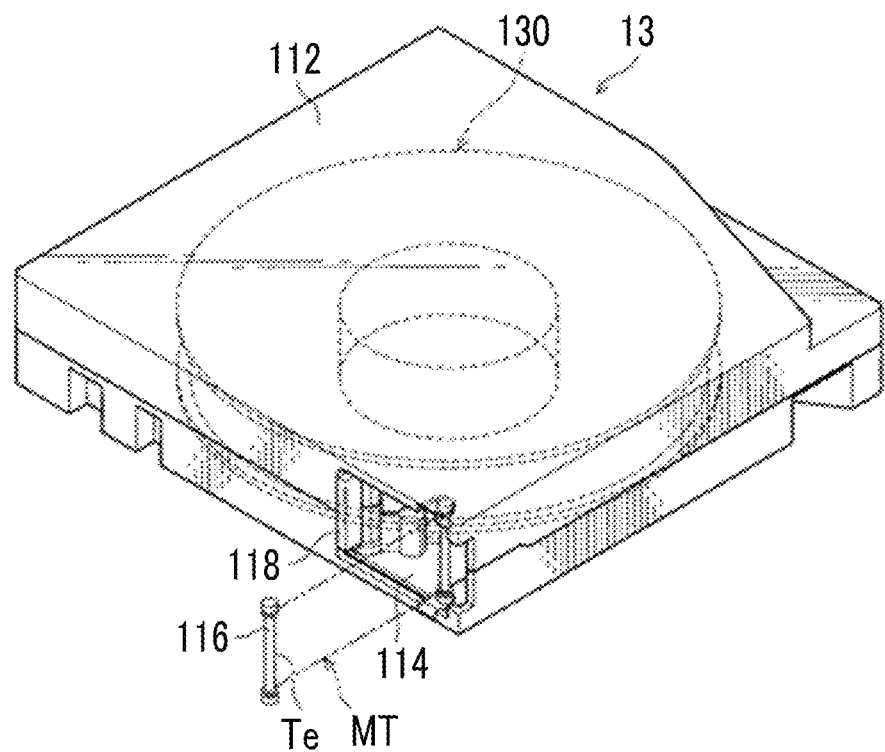
FIG. 2 is a perspective view of an example of a magnetic tape cartridge.

FIG. 2 is a perspective view of an example of a magnetic tape cartridge. FIG. 2 shows a single reel type magnetic tape cartridge.

A magnetic tape cartridge 13 shown in FIG. 2 includes a case 112. The case 112 is formed in a rectangular box shape. The case 112 is generally made of a resin such as polycarbonate. Inside the case 112, only one reel 130 is rotatably accommodated.

Figure 3:
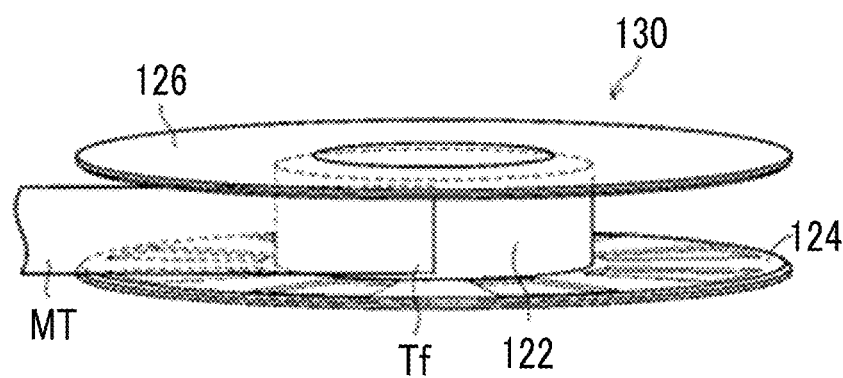
FIG. 3 is a perspective view in a case where the magnetic tape is started to be wound around a reel.
Figure 4:
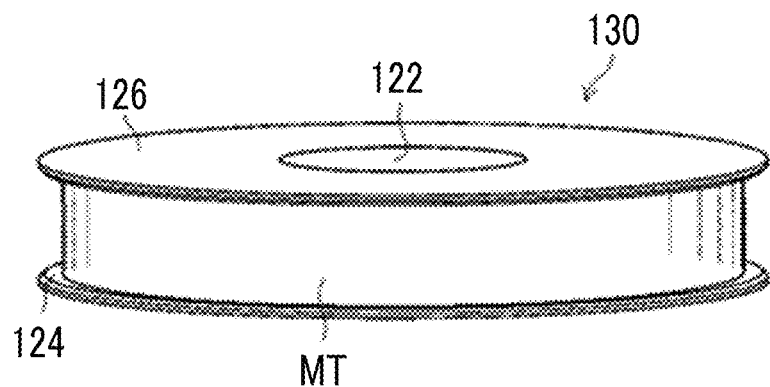
FIG. 4 is a perspective view in a case where the magnetic tape has been wound around the reel.

FIG. 3 is a perspective view in a case where a magnetic tape is started to be wound around a reel. FIG. 4 is a perspective view in a case where the magnetic tape has been wound around the reel.

The reel 130 includes a cylindrical reel hub 122 that constitutes an axial center portion.

The reel hub is a cylindrical member that configures an axial center portion around which the magnetic tape is wound in the magnetic tape cartridge. In the magnetic tape cartridge, the reel hub can be a single-layer cylindrical member or can be a multi-layered cylindrical member having two or more layers. From viewpoints of manufacturing cost and ease of manufacturing, the reel hub is preferably a single-layer cylindrical member.

It is considered that, in a case where the magnetic tape is wound, the reel hub receives a winding force in a center direction and tends to be deformed in a direction in which the diameter decreases, and it is considered that the reel hub having lower stiffness is more likely to be deformed. It is surmised that, on the cartridge core side of the magnetic tape, a compressive stress is generated in a direction of shortening a tape length so as to correspond to the deformation of the reel hub, and then a tensile stress is generated in a direction of widening the tape width due to the compression caused by this compressive stress. It is considered that the larger the stress generated as described above, the greater the deformation of the magnetic tape during the storage in the magnetic tape cartridge. On the other hand, in a case where the stiffness of the reel hub is high, the deformation described above can be suppressed, so that the stress generation can also be suppressed. It is surmised that this can lead to decreasing the values of the magnetic tape maximum deformation amount after storage in five environments for 1 year, the rate of the change of the magnetic tape deformation amount with respect to the relative humidity, and the rate of the change of the magnetic tape deformation amount with respect to the temperature. From this viewpoint, in one aspect, a bending elastic modulus of a material constituting at least an outer peripheral side surface layer portion of the reel hub is preferably 5 GPa or more, more preferably 6 GPa or more, even more preferably 7 GPa or more, and still preferably 8 GPa or more. The bending elastic modulus can be, for example, 20 GPa or less, 15 GPa or less, or 10 GPa or less. However, since the high bending elastic modulus is preferable from a viewpoint of suppressing the deformation of the reel hub, the bending elastic modulus may exceed the value exemplified here.

In a case where the reel hub is the single-layer cylindrical member, the bending elastic modulus is a bending elastic modulus of the material constituting the cylindrical member.

On the other hand, in a case where the reel hub is a multi-layered cylindrical member having two or more layers, the bending elastic modulus is a bending elastic modulus of the material constituting at least the outer peripheral side surface layer portion of the reel hub. In the present invention and the present specification, the "bending elastic modulus" is a value obtained according to JIS (Japanese Industrial Standards) K 7171: 2016.

JIS K 7171: 2016 is the Japanese Industrial Standard created based on ISO (International Organization for Standardization) 178 and Amendment 1: 2013, which was published as the 5th edition in 2010, without changing the technical contents.

A test piece used for measuring the bending elastic modulus is prepared according to section 6 "Test piece" of JIS K 7171: 2016.

Examples of the material constituting the reel hub include a resin and a metal. Examples of the metal include aluminum. The resin is preferable from viewpoints of cost, productivity, and the like. Examples of the resin include fiber reinforced resins. Examples of the fiber reinforced resin include a glass fiber reinforced resin and a carbon fiber reinforced resin. As such a fiber reinforced resin, a fiber reinforced polycarbonate is preferable. This is because polycarbonate is easy to procure and can be molded with a high accuracy and at low cost by a general-purpose molding machine such as an injection molding machine. In addition, in the glass fiber reinforced resin, a content of the glass fiber is preferably 15% by mass or more. The higher the content of glass fiber, the higher the bending elastic modulus of the glass fiber reinforced resin tends to be. As an example, the content of the glass fiber of the glass fiber reinforced resin can be 50% by mass or less or 40% by mass or less. In one embodiment, the resin constituting the reel hub is preferably glass fiber reinforced polycarbonate. In addition, as the resin constituting the reel hub, a high-strength resin generally called a super engineering plastic or the like can be used. An example of a super engineering plastic is polyphenylene sulfide (PPS).

A thickness of the reel hub is preferably in a range of 2.0 to 3.0 mm, from viewpoints of satisfying both a strength of the reel hub and a dimensional accuracy during molding. The thickness of the reel hub means a total thickness of such multiple layers for a reel hub having a multi-layer structure of two or more layers. An outer diameter of the reel hub is usually determined by the standard of the magnetic recording and reproducing device, and can be in a range of, for example, 20 to 60 mm.

Flanges (lower flange 124 and upper flange 126) protruding outward in a radial direction from an upper end portion and a lower end portion of the reel hub 122, respectively are provided on both end portions of the reel hub 122. Here, regarding "upper" and "lower", in a case where the magnetic tape cartridge is mounted on the magnetic recording and reproducing device, a side located above is referred to as "upper" and a side located below is referred to as "lower". One or both of the lower flange 124 and the upper flange 126 is preferably configured integrally with the reel hub 122, from a viewpoint of reinforcing the upper end portion side and/or the lower end portion side of the reel hub 122. The term "integrally configured" means that it is configured as one member, not as a separate member. In a first embodiment, the reel hub 122 and the upper flange 126 are configured as one member, and this member is joined to the lower flange 124 configured as a separate member by a well-known method. In a second embodiment, the reel hub 122 and the lower flange 124 are configured as one member, and this member is joined to the upper flange 126 configured as a separate member by a well-known method. The reel of the magnetic tape cartridge may be in any form. Each member can be manufactured by a well-known molding method such as injection molding.

A magnetic tape MT is wound around an outer circumference of the reel hub 122 starting from a tape inner end Tf (see FIG. 3). The reduction of the tension applied in the longitudinal direction of the magnetic tape in a case of winding the magnetic tape around the reel hub of the cartridge reel during the manufacture of the magnetic tape cartridge (hereinafter, also referred to as a "winding tension during manufacture") also contributes to reduction of the values of the magnetic tape maximum deformation amount after storage in five environments for 1 year, the rate of the change in magnetic tape deformation amount with respect to the relative humidity, and the rate of the change in magnetic tape deformation amount with respect to the temperature. From this point, the winding tension during manufacture is preferably 0.40 N or less, and can also be, for example, 0.30 N or less. The winding tension during manufacture can be, for example, 0.10 N or more or 0.20 N or more, or can be tension-free. The winding tension during manufacture can be a constant value or can also be changed. The winding tension during manufacture is a set value in a manufacturing apparatus of the magnetic tape cartridge.

A side wall of the case 112 has an opening 114 for drawing out the magnetic tape MT wound around the reel 130, and a leader pin 116 that is drawn out while being locked by a drawing member (not shown) of the magnetic recording and reproducing device (not shown) is fixed to a tape outer end Te of the magnetic tape MT drawn out from this opening 114.

In addition, the opening 114 is opened and closed by a door 118. The door 118 is formed in a shape of a rectangular plate having a size capable of closing the opening 114, and is biased by a bias member (not shown) in a direction of closing the opening 114. In a case where the magnetic tape cartridge 13 is mounted on the magnetic recording and reproducing device, the door 118 is opened against a bias force of the bias member.

A well-known technology can be applied for other details of the magnetic tape cartridge. An entire length of the magnetic tape accommodated in the magnetic tape cartridge is not particularly limited, and can be in a range of approximately, for example, 800 m to 2,500 m. The longer the entire length of the tape accommodated in one reel of the magnetic tape cartridge is, the more preferable it is from a viewpoint of increasing the capacity of the magnetic tape cartridge.

Tension During Running and Tension During Winding on Cartridge Reel

In the magnetic recording and reproducing device, the magnetic tape can run between the cartridge reel (supply reel) and the winding reel to record data on the magnetic tape and/or reproduce the recorded data. In the magnetic recording and reproducing device described above, the tension can be applied in the longitudinal direction of the magnetic tape during such running. As a greater tension is applied in the longitudinal direction of the magnetic tape, a dimension of the magnetic tape in a width direction can be more greatly contraction (that is, can be further narrowed), and as the tension is small, a degree of the shrinkage can be reduced. Therefore, the dimension of the magnetic tape in the width direction can be controlled by the value of the tension applied in the longitudinal direction of the magnetic tape running in the magnetic recording and reproducing device. In the magnetic recording and reproducing device described above, in the one embodiment, the magnetic tape can run in a state where a tension of 0.50 N or more is applied in the longitudinal direction at the maximum. It is considered that, in a case where the magnetic tape is stored in the magnetic tape cartridge as it is after running in a state where a great tension is applied, the magnetic tape is likely to be deformed during the storage. As described above, it is surmised that different deformations occur depending on the position such that, during the storage, in the magnetic tape accommodated in the magnetic tape cartridge, a part near the cartridge reel is deformed wider than the initial stage due to compressive stress in a tape thickness direction, and a part far from the cartridge reel is deformed narrower than the initial stage due to the tensile stress in the tape longitudinal direction. It is considered that, in the magnetic tape accommodated in a state where a great tension is applied, the deformations more greatly vary depending on the position.

Therefore, in the one embodiment, in the magnetic recording and reproducing device described above, in a case where the magnetic tape is wound around the cartridge reel after the running is performed in a state where the tension of 0.50 N or more is applied in the longitudinal direction at maximum, the tension applied in the longitudinal direction of the magnetic tape is preferably 0.40 N or less. Accordingly, the inventors have considered that, since the magnetic tape can be wound around the cartridge reel with a tension smaller than the tension applied in the longitudinal direction during the running and stored in the magnetic tape cartridge, the occurrence of a phenomenon occurred due to the deformation described above can be further suppressed. In addition, the inventors have surmised that, regardless of whether or not the tension is applied during running and the tension value, in a case of winding the magnetic tape around the cartridge reel after running, the tension applied in the longitudinal direction of the magnetic tape set to 0.40 N or less is preferable to further suppress the occurrence of a phenomenon that may occur due to the deformation described above.

In a case of applying the tension in the longitudinal direction of the running magnetic tape in the magnetic recording and reproducing device, a maximum value of the tension can be 0.50 N or more, and can also be 0.60 N or more, 0.70 N or more, or 0.80 N or more. The maximum value can be, for example, 1.50 N or less, 1.40 N or less, 1.30 N or less, 1.20 N or less, 1.10 N or less, or 1.00 N or less. The tension applied in the longitudinal direction of the magnetic tape during the running can be a constant value or can also be changed. In the case of a constant value, the tension applied in the longitudinal direction of the magnetic tape can be controlled by, for example, the control device of the magnetic recording and reproducing device so that the tension of a constant value is applied in the longitudinal direction of the magnetic tape. On the other hand, in a case where the tension applied in the longitudinal direction of the magnetic tape during the running is changed, for example, the dimension information of the magnetic tape in the width direction during the running can be obtained using a servo signal, and the tension applied in the longitudinal direction of the magnetic tape can be adjusted and changed according to the obtained dimension information. Accordingly, the dimension of the magnetic tape in the width direction can be controlled. One embodiment of such tension adjustment is as described above with reference to FIG. 1. However, the magnetic recording and reproducing device is not limited to the exemplified embodiment. In the magnetic recording and reproducing device described above, in a case where the tension applied in the longitudinal direction of the magnetic tape during the running is changed, the minimum value thereof can be, for example, 0.10 N or more, 0.20 N or more, 0.30 N or more, or 0.40 N or more. In addition, the minimum value thereof can be, for example, 0.40 N or less than 0.40 N in one embodiment, and can be 0.60 N or less or 0.50 N or less in another embodiment.

In the magnetic recording and reproducing device, in a case where the magnetic tape runs for recording and/or reproducing data, the following embodiment can be provided as a specific embodiment of running the magnetic tape.

Embodiment 1: At the end of running for recording and/or reproducing data, the entire length of the magnetic tape is wound on the winding reel.

Embodiment 2: At the end of running for recording and/or reproducing data, the entire length of the magnetic tape is wound on the cartridge reel.

Embodiment 3: At the end of running for recording and/or reproducing data, a part of the magnetic tape is wound around the cartridge reel and another part thereof is wound around the winding reel.

The tension in a case where the magnetic tape after running is wound around the cartridge reel by applying tension in the longitudinal direction of the magnetic tape (hereinafter, also referred to as "rewinding tension") means the following tension.

In the embodiment 1, the rewinding tension is a tension applied in the longitudinal direction of the magnetic tape, in a case where the entire length of the magnetic tape is wound around the cartridge reel to be accommodated in the magnetic tape cartridge.

In the embodiment 2, first, the magnetic tape is wound from the cartridge reel to the winding reel. In this case, the tension applied in the longitudinal direction of the magnetic tape is not particularly limited. The tension may be a constant value, may be changed, may be as in the above description regarding the value of the tension during the running, or may be not. The tension applied in the longitudinal direction of the magnetic tape in a case where the magnetic tape is subsequently wound around the cartridge reel is the rewinding tension. The tension is a tension applied in the longitudinal direction of the magnetic tape in a case of winding the entire length of the magnetic tape from the winding reel to the cartridge reel.

The embodiment 3 can be any of the following two embodiments. In a first embodiment (embodiment 3-1), a part of the magnetic tape that is wound around the cartridge reel, at the end of the running for the recording and/or the reproducing of data, is wound by applying a tension in the longitudinal direction during the winding around the cartridge reel. The tension during the winding is the rewinding tension. A second embodiment (embodiment 3-2) is an embodiment other than the embodiment 3-1 of the embodiment 3. In order to wind the entire length of the magnetic tape around the cartridge reel and accommodate it in the cartridge, in the embodiment 3-1, the tension applied in the longitudinal direction of the magnetic tape, in a case where the magnetic tape is not wound around the cartridge reel is wound around the cartridge reel is the rewinding tension. The embodiment 3-2 is the same as the embodiment 2. That is, first, the magnetic tape is wound from the cartridge reel to the winding reel. The tension applied in the longitudinal direction of the magnetic tape in a case of subsequently winding the entire length of the magnetic tape from the winding reel to the cartridge reel is the rewinding tension.

In any of the above embodiments 1, 2 and 3, the tension (rewinding tension) applied in the longitudinal direction of the magnetic tape in a case of winding it around the cartridge reel is preferably 0.40 N or less. The rewinding tension may be a constant value or may be changed. In the one embodiment, the rewinding tension may be a constant value of 0.40 N or less, or may be changed in a range of 0.40 N or less. In a case of changing, the maximum value of the tension applied in the longitudinal direction of the magnetic tape in a case of winding it around the cartridge reel is preferably 0.40 N or less, and can also be, for example, 0.30 N or less. The minimum value of the tension applied in the longitudinal direction of the magnetic tape in a case of winding it around the cartridge reel may be, for example, 0.10 N or more or 0.20 N or more, or may be less than the value exemplified here. The tension (rewinding tension) while winding around the cartridge reel can be controlled by, for example, the control device of the magnetic recording and reproducing device. In addition, an operation program is recorded in the cartridge memory so that the winding around the cartridge reel is performed by applying the rewinding tension set after the recording and/or reproducing of data on the magnetic tape in the longitudinal direction of the magnetic tape, and the control device may read this program to execute the winding operation.

Magnetic Tape

In the magnetic tape cartridge, the magnetic tape is wound around the cartridge reel and accommodated. Hereinafter, the magnetic tape will be described more specifically.

Non-Magnetic Support

The magnetic tape includes a non-magnetic support, and a magnetic layer containing a ferromagnetic powder. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used.

In the one embodiment, the non-magnetic support of the magnetic tape can be an aromatic polyester support. In the invention and the specification, "aromatic polyester" means a resin including an aromatic skeleton and a plurality of ester bonds, and the "aromatic polyester support" means a support including at least one layer of an aromatic polyester film. The "aromatic polyester film" is a film in which the largest component in the component configuring this film based on mass is aromatic polyester. The "aromatic polyester support" of the invention and the specification include a support in which all of resin films included in this support is the aromatic polyester film and a support including the aromatic polyester film and the other resin film. Specific examples of the aromatic polyester support include a single aromatic polyester film, a laminated film of two or more layers of the aromatic polyester film having the same constituting component, a laminated film of two or more layers of the aromatic polyester film having different constituting components, and a laminated film including one or more layers of the aromatic polyester film and one or more layers of resin film other than the aromatic polyester. In the laminated film, an adhesive layer or the like may be randomly included between two adjacent layers. In addition, the aromatic polyester support may randomly include a metal film and/or a metal oxide film formed by performing vapor deposition or the like on one or both surfaces. The same applies to a "polyethylene terephthalate support" and a "polyethylene naphthalate support" in the invention and the specification.

An aromatic ring included in an aromatic skeleton including the aromatic polyester is not particularly limited. Specific examples of the aromatic ring include a benzene ring and a naphthalene ring.

For example, polyethylene terephthalate (PET) is polyester including a benzene ring, and is a resin obtained by polycondensation of ethylene glycol and terephthalic acid and/or dimethyl terephthalate. The "polyethylene terephthalate" of the invention and the specification includes polyethylene terephthalate having a structure including one or more kinds of other components (for example, copolymerization component, and component introduced to a terminal or a side chain), in addition to the component described above.

Polyethylene naphthalate (PEN) is polyester including a naphthalene ring, and is a resin obtained by performing esterification reaction of dimethyl 2,6-naphthalene dicarboxylate and ethylene glycol, and then, transesterification and polycondensation reaction. The "polyethylene naphthalate" of the invention and the specification includes polyethylene naphthalate having a structure including one or more kinds of other components (for example, copolymerization component, and component introduced to a terminal or a side chain), in addition to the component described above.

In addition, in the one embodiment, the non-magnetic support of the magnetic tape can be an aromatic polyamide support. In the invention and the specification, the "aromatic polyamide" means a resin containing an aromatic skeleton and a plurality of amide bonds. An aromatic ring included in an aromatic skeleton including the aromatic polyamide is not particularly limited. Specific examples of the aromatic ring include a benzene ring and the like. The "aromatic polyamide support" means a support including at least one layer of an aromatic polyamide film. The "aromatic polyamide film" refers to a film in which the largest component in the component configuring this film based on mass is aromatic polyamide. The "aromatic polyamide support" of the invention and the specification include a support in which all of resin films included in this support is the aromatic polyamide film and a support including the aromatic polyamide film and the other resin film. Specific examples of the aromatic polyamide support include a single aromatic polyamide film, a laminated film of two or more layers of the aromatic polyamide film having the same constituting component, a laminated film of two or more layers of the aromatic polyamide film having different constituting components, and a laminated film including one or more layers of the aromatic polyamide film and one or more layers of resin film other than the aromatic polyamide. In the laminated film, an adhesive layer or the like may be randomly included between two adjacent layers. In addition, the aromatic polyamide support may randomly include a metal film and/or a metal oxide film formed by performing vapor deposition or the like on one or both surfaces.

In addition, the non-magnetic support can be a biaxial stretching film, and may be a film subjected to corona discharge, plasma treatment, easy adhesion treatment, heat treatment, or the like.

As an indicator of physical properties of the non-magnetic support, for example, a moisture content can be used. In the invention and the specification, the moisture content of the non-magnetic support is a value obtained by the following method. The moisture content shown in the table which will be described later is a value obtained by the following method.

A test piece (for example, a test piece having a mass of several grams) cut out from the non-magnetic support, moisture content of which is to be measured, is dried in a vacuum dryer at a temperature of 180° C. and under a pressure of 100 Pa (pascal) or less until a constant weight is obtained. The mass of the dried test piece is defined as W1. W1 is a value measured in a measurement environment of a temperature of 23° C. and relative humidity of 50% within 30 seconds after being taken out of the vacuum dryer. Next, the mass of this test piece after being placed in an environment of a temperature of 25° C. and relative humidity of 75% for 48 hours is defined as W2. W2 is a value measured in a measurement environment of a temperature of 23° C. and relative humidity of 50% within 30 seconds after being taken out of the environment. The moisture content is calculated by the following equation.

Content (%)=[(W2−W1)/W1]×100

For example, it is also possible to obtain the moisture content of the non-magnetic support can be obtained by the method described above, after removing portions other than the non-magnetic support such as the magnetic layer from the magnetic tape by a well-known method (for example, film removal using an organic solvent).

In one embodiment, the moisture content of the non-magnetic support of the magnetic tape is preferably 2.0% or less, more preferably 1.8% or less, even more preferably 1.6% or less, further preferably 1.4% or less, even further preferably 1.2% or less, and still preferably 1.0% or less. In addition, the moisture content of the non-magnetic support of the magnetic tape can be 0%, 0% or more, more than 0%, or 0.1% or more. The use of the non-magnetic support having a low moisture content can lead to decreasing the values of the magnetic tape maximum deformation amount after storage in five environments for 1 year, the rate of the change of the magnetic tape deformation amount with respect to the relative humidity, and the rate of the change of the magnetic tape deformation amount with respect to the temperature.

As an indicator of physical properties of the non-magnetic support, a Young's modulus can also be used. The Young's modulus of the non-magnetic support in the present invention and the present specification is a value measured by the following method in a measurement environment of a temperature of 23° C. and a relative humidity of 50%. The Young's modulus shown in the following table is a value obtained by the following method using TENSILON manufactured by Baldwin Corporation as a universal tensile testing device.

A test piece cut out from the non-magnetic support to be measured is pulled by a universal tensile testing device under the conditions of a chuck-to-chuck distance of 100 mm, a tensile rate of 10 mm/min, and a chart rate of 500 mm/min. As the universal tensile testing device, for example, a commercially available universal tensile testing device such as TENSILON manufactured by Baldwin Corporation or a universal tensile testing device having a well-known configuration can be used. The Young's moduli of the test piece in the longitudinal direction and the width direction are respectively calculated from a tangent line of a rising portion of a load-elongation curve obtained as described above. Here, the longitudinal direction and the width direction of the test piece mean a longitudinal direction and a width direction in a case where this test piece is included in the magnetic tape.

For example, it is also possible to obtain the Young's moduli of the non-magnetic support in the longitudinal direction and the width direction can be obtained by the method described above, after removing portions other than the non-magnetic support such as the magnetic layer from the magnetic tape by a well-known method (for example, film removal using an organic solvent).

In one embodiment, the Young's modulus in the longitudinal direction of the non-magnetic support of the magnetic tape is preferably 3000 MPa or more, more preferably 4000 MPa or more, even more preferably 5000 MPa or more, and further preferably 6000 MPa or more. In addition, the Young's modulus of the non-magnetic support of the magnetic tape in the longitudinal direction can be 15000 MPa or less, 13000 MPa or less, or 12000 MPa or less. In the width direction, the Young's modulus in the width direction of the non-magnetic support of the magnetic tape is preferably 2000 MPa or more, more preferably 3000 MPa or more, even more preferably 4000 MPa or more, and further preferably 5000 MPa or more. In addition, the Young's modulus of the non-magnetic support of the magnetic tape in the width direction can be 12000 MPa or less, 11000 MPa or less, or 10000 MPa or less. During manufacturing the magnetic tape, for the non-magnetic support, usually, a machine direction (MD direction) of a film is used as the longitudinal direction and a transverse direction (TD direction) is used as the width direction. In addition, in one embodiment, the Young's modulus in the longitudinal direction is preferably greater than the Young's modulus in the width direction, and a difference (Young's modulus in the longitudinal direction−Young's modulus in the width direction) is more preferably in the range of 800 to 3000 MPa. The values of the magnetic tape maximum deformation amount after storage in five environments for 1 year, the rate of the change of the magnetic tape deformation amount with respect to the relative humidity, and the rate of the change of the magnetic tape deformation amount with respect to the temperature can also be controlled by the Young's modulus of the non-magnetic support.

The moisture content and the Young's modulus of the non-magnetic support can be controlled by a type and a mixing ratio of the components constituting the support, manufacturing conditions of the support, and the like. For example, in a biaxial stretching process, the Young's modulus in the longitudinal direction and the Young's modulus in the width direction can be controlled respectively by adjusting the stretching ratio in each direction.

Magnetic Layer
Ferromagnetic Powder

As the ferromagnetic powder included in the magnetic layer of the magnetic tape, a well-known ferromagnetic powder can be used as one kind or in combination of two or more kinds as the ferromagnetic powder used in the magnetic layer of various magnetic recording media. It is preferable to use a ferromagnetic powder having a small average particle size as the ferromagnetic powder, from a viewpoint of improvement of a recording density. From this viewpoint, an average particle size of the ferromagnetic powder is preferably equal to or smaller than 50 nm, more preferably equal to or smaller than 45 nm, even more preferably equal to or smaller than 40 nm, further preferably equal to or smaller than 35 nm, further more preferably equal to or smaller than 30 nm, further even more preferably equal to or smaller than 25 nm, and still preferably equal to or smaller than 20 nm. Meanwhile, from a viewpoint of stability of magnetization, the average particle size of the ferromagnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm.

Hexagonal Ferrite Powder

As a preferred specific example of the ferromagnetic powder, a hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), a yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), a ytterbium atom (Yb), and a lutetium atom (Lu).

Hereinafter, the hexagonal strontium ferrite powder which is one embodiment of the hexagonal ferrite powder will be described more specifically.

An activation volume of the hexagonal strontium ferrite powder is preferably in a range of 800 to 1,600 $nm^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 $nm^3$, and can also be, for example, equal to or greater than 850 $nm^3$. In addition, from a viewpoint of further improving the electromagnetic conversion characteristics, the activation volume of the hexagonal strontium ferrite powder is more preferably equal to or smaller than 1,500 $nm^3$, even more preferably equal to or smaller than 1,400 $nm^3$, still preferably equal to or smaller than 1,300 $nm^3$, still more preferably equal to or smaller than 1,200 $nm^3$, and still even more preferably equal to or smaller than 1,100 $nm^3$. The same applies to the activation volume of the hexagonal barium ferrite powder.

The "activation volume" is a unit of magnetization reversal and an indicator showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×$10^{-1}$ J/$m^3$.

$$Hc = 2Ku/Ms\{1-[(kT/KuV)\ln(At/0.693)]^{1/2}\}$$

[In the expression, Ku: anisotropy constant (unit: J/$m^3$), Ms: saturation magnetization (unit: kA/m), k: Boltzmann's constant, T: absolute temperature (unit: K), V: activation volume (unit: $cm^3$), A: spin precession frequency (unit: $s^{-1}$), and t: magnetic field reversal time (unit: s)]

The anisotropy constant Ku can be used as an indicator of reduction of thermal fluctuation, that is, improvement of thermal stability. The hexagonal strontium ferrite powder can preferably have Ku equal to or greater than 1.8×$10^5$ J/$m^3$, and more preferably have Ku equal to or greater than 2.0×$10^5$ J/$m^3$. In addition, Ku of the hexagonal strontium ferrite powder can be, for example, equal to or smaller than 2.5×$10^5$ J/$m^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In the one embodiment, the hexagonal strontium ferrite powder including the rare earth atom can have a rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content>1.0. The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content>1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder towards the inside from the surface.

In a case where the hexagonal strontium ferrite powder includes the rare earth atom, a content (bulk content) of the rare earth atom is preferably 0.5 to 5.0 atom % with respect to 100 atom % of the iron atom. It is considered that the rare earth atom having the bulk content in the range described above and uneven distribution of the rare earth atom in the surface layer portion of the particles configuring the hexagonal strontium ferrite powder contribute to the prevention of a decrease in reproducing output during the repeated reproducing. It is surmised that this is because the rare earth atom having the bulk content in the range described above included in the hexagonal strontium ferrite powder and the uneven distribution of the rare earth atom in the surface layer portion of the particles configuring the hexagonal strontium ferrite powder can increase the anisotropy constant Ku. As the value of the anisotropy constant Ku is high, occurrence of a phenomenon called thermal fluctuation (that is, improvement of thermal stability) can be prevented. By preventing the occurrence of the thermal fluctuation, a decrease in reproducing output during the repeated reproducing can be prevented. It is surmised that the uneven distribution of the rare earth atom in the surface layer portion of the particles of the hexagonal strontium ferrite powder contributes to stabilization of a spin at an iron (Fe) site in a crystal lattice of the surface layer portion, thereby increasing the anisotropy constant Ku.

In addition, it is surmised that the use of the hexagonal strontium ferrite powder having the rare earth atom surface layer portion uneven distribution as the ferromagnetic powder of the magnetic layer also contributes to the prevention of chipping of the surface of the magnetic layer due to the sliding with the magnetic head. That is, it is surmised that, the hexagonal strontium ferrite powder having the rare earth atom surface layer portion uneven distribution can also contribute to the improvement of running durability of the magnetic tape. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving strength of the magnetic layer.

From a viewpoint of even more preventing reduction of the reproduction output in the repeated reproduction and/or a viewpoint of further improving running durability, the content of rare earth atom (bulk content) is more preferably in a range of 0.5 to 4.5 atom %, even more preferably in a range of 1.0 to 4.5 atom %, and still preferably in a range of 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atoms. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of even more suppressing reduction of the reproduction output during the repeated reproduction can include a neodymium atom, a samarium atom, a yttrium atom, and a dysprosium atom, a neodymium atom, a samarium atom, and a yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atoms are unevenly distributed in the surface layer portion (that is, a larger amount of the rare earth atoms is present, compared to that inside), in the particles configuring the hexagonal strontium ferrite powder. A ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by, for example, a method disclosed in a paragraph 0032 of JP2015-91747A.

The partial dissolving means dissolving performed so that the hexagonal strontium ferrite powder remaining in the solution can be visually confirmed in a case of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed in a case of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 mL of hydrochloric acid having a concentration of 1 mol/L is held on a hot plate at a set temperature of 70° C. for 1 hour. The obtained solution is filtered with a membrane filter having a hole diameter of 0.1 μm. The element analysis of the filtrate obtained as described above is performed by an inductively coupled plasma (ICP) analysis device. By doing so, the surface layer portion content of the rare earth atom with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 mL of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic tape, it is desirable that the mass magnetization σs of ferromagnetic powder included in the magnetic tape is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that, hexagonal strontium ferrite powder having the rare earth atom surface layer portion uneven distribution is also preferable for preventing such a significant decrease in σs. In one embodiment, σs of the hexagonal strontium ferrite powder can be equal to or greater than 45 A×m²/kg and can also be equal to or greater than 47 A×m²/kg. On the other hand, from a viewpoint of noise reduction, σs is preferably equal to or smaller than 80 A×m²/kg and more preferably equal to or smaller than 60 A×m²/kg. σs can be measured by using a well-known measurement device capable of measuring magnetic properties such as an oscillation sample type magnetic-flux meter. In the invention and the specification, the mass magnetization σs is a value measured at a magnetic field strength of 15 kOe, unless otherwise noted. 1 [kOe]=($10^6$/$4\pi$) [A/m]

Regarding the content (bulk content) of the constituting atom in the hexagonal strontium ferrite powder, a content of the strontium atom can be, for example, 2.0 to 15.0 atom % with respect to 100 atom % of the iron atom. In one embodiment, in the hexagonal strontium ferrite powder, the divalent metal atom included in this powder can be only a strontium atom. In another embodiment, the hexagonal strontium ferrite powder can also include one or more kinds of other divalent metal atoms, in addition to the strontium atom. For example, the hexagonal strontium ferrite powder can include a barium atom and/or a calcium atom. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one embodiment, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can also include a rare earth atom. In addition, the hexagonal strontium ferrite powder may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of even more preventing the reduction of the reproduction output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one embodiment, the hexagonal strontium ferrite powder may not include atoms other than the iron atom, the strontium atom, the oxygen atom, and the rare earth atom. The content shown with atom % described above is obtained by converting the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device.

In one embodiment, the hexagonal strontium ferrite powder does not include a bismuth atom (Bi).

Metal Powder

As a preferred specific example of the ferromagnetic powder, a ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a manufacturing method of the ε-iron oxide powder, a manufacturing method from a goethite, a reverse micelle method, and the like are known. All of the manufacturing methods are well known. For the method of manufacturing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. S280-S284, J. Mater. Chem. C, 2013, 1, pp. 5200-5206 can be referred, for example. However, the manufacturing method of the ε-iron oxide powder capable of being used as the ferromagnetic powder in the magnetic layer of the magnetic tape is not limited to the method described here.

An activation volume of the ε-iron oxide powder is preferably 300 to 1,500 $nm^3$. The atomized ε-iron oxide powder showing the activation volume in the range described above is suitable for manufacturing a magnetic tape exhibiting excellent electromagnetic conversion characteristics. The activation volume of the ε-iron oxide powder is preferably equal to or greater than 300 $nm^3$, and can also be, for example, equal to or greater than 500 $nm^3$. In addition, from a viewpoint of further improving the electromagnetic conversion characteristics, the activation volume of the ε-iron oxide powder is more preferably equal to or smaller than 1,400 $nm^3$, even more preferably equal to or smaller than 1,300 $nm^3$, still preferably equal to or smaller than 1,200 $nm^3$, and still more preferably equal to or smaller than 1,100 $nm^3$.

The anisotropy constant Ku can be used as an indicator of reduction of thermal fluctuation, that is, improvement of thermal stability. The ε-iron oxide powder can preferably have Ku equal to or greater than $3.0 \times 10^4$ $J/m^3$, and more preferably have Ku equal to or greater than $8.0 \times 10^4$ $J/m^3$. In addition, Ku of the ε-iron oxide powder can be, for example, equal to or smaller than $3.0 \times 10^5$ $J/m^3$. However, the high Ku is preferable, because it means high thermal stability, and thus, Ku is not limited to the exemplified value.

From a viewpoint of increasing reproducing output in a case of reproducing data recorded on a magnetic tape, it is desirable that the mass magnetization as of ferromagnetic powder included in the magnetic tape is high. In regard to this point, in one embodiment, as of the ε-iron oxide powder can be equal to or greater than 8 $A \times m^2/kg$ and can also be equal to or greater than 12 $A \times m^2/kg$. On the other hand, from a viewpoint of noise reduction, as of the ε-iron oxide powder is preferably equal to or smaller than 40 $A \times m^2/kg$ and more preferably equal to or smaller than 35 $A \times m^2/kg$.

In the invention and the specification, average particle sizes of various powders such as the ferromagnetic powder and the like are values measured by the following method with a transmission electron microscope, unless otherwise noted.

The powder is imaged at an imaging magnification ratio of 100,000 with a transmission electron microscope, the image is printed onto a photographic printing paper so that a total magnification ratio of 500,000 of an image of particles configuring the powder is obtained. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic mean of the particle size of 500 particles obtained as described above is the average particle size of the powder. As the transmission electron microscope, a transmission electron microscope H-9000 manufactured by Hitachi, Ltd. can be used, for example. In addition, the measurement of the particle size can be performed by a well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an embodiment in which particles configuring the aggregate are directly in contact with each other, but also includes an embodiment in which a binding agent or an additive which will be described later is interposed between the particles. A term, particles may be used for representing the powder.

As a method for collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a major axis configuring the particle, that is, a major axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the major axis configuring the particles cannot be specified from the shape, the particle size is shown as an equivalent circle diameter. The equivalent circle diameter is a value obtained by a circle projection method.

In addition, regarding an average acicular ratio of the powder, a length of a minor axis, that is, a minor axis length of the particles is measured in the measurement described above, a value of (major axis length/minor axis length) of each particle is obtained, and an arithmetic mean of the values obtained regarding 500 particles is calculated. Here, unless otherwise noted, in a case of (1), the minor axis length as the definition of the particle size is a length of a minor axis configuring the particle, in a case of (2), the minor axis length is a thickness or a height, and in a case of (3), the major axis and the minor axis are not distinguished, thus, the value of (major axis length/minor axis length) is assumed as 1, for convenience.

In addition, unless otherwise noted, in a case where the shape of the particle is specified, for example, in a case of definition of the particle size (1), the average particle size is an average major axis length, and in a case of the same definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass with respect to a total mass of the magnetic layer. A high filling percentage of the ferromagnetic powder in the magnetic layer is preferable from a viewpoint of improvement of recording density.

Binding Agent

The magnetic tape may be a coating type magnetic tape, and can include a binding agent in the magnetic layer. The binding agent is one or more kinds of resin. As the binding agent, various resins normally used as a binding agent of a coating type magnetic tape can be used. As the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the non-magnetic layer and/or a back coating layer which will be described later.

For the binding agent described above, descriptions disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions. The amount of the binding agent used can be, for example, 1.0 to 30.0 parts by mass with respect to 100.0 parts by mass of the ferromagnetic powder.

GPC device: HLC-8120 (manufactured by Tosoh Corporation)
Column: TSK gel Multipore HXL-M (manufactured by Tosoh Corporation, 7.8 mmID (inner diameter)×30.0 cm)
Eluent: Tetrahydrofuran (THF)

Curing Agent

A curing agent can also be used together with the resin which can be used as the binding agent. As the curing agent, in one embodiment, a thermosetting compound which is a compound in which a curing reaction (crosslinking reaction) proceeds due to heating can be used, and in another embodiment, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, and polyisocyanate is suitable. For the details of polyisocyanate, descriptions disclosed in paragraphs 0124 and 0125 of JP2011-216149A can be referred to. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer may include one or more kinds of additives, as necessary. As the additives, a commercially available product can be suitably selected and used according to the desired properties. Alternatively, a compound synthesized by a well-known method can be used as the additives. The additive can be used with a random amount. As the additives, the curing agent described above is used as an example. In addition, examples of the additive included in the magnetic layer include a non-magnetic powder (for example, inorganic powder, carbon black, or the like), a lubricant, a dispersing agent, a dispersing assistant, a fungicide, an antistatic agent, and an antioxidant. For the lubricant, a description disclosed in paragraphs 0030 to 0033, 0035, and 0036 of JP2016-126817A can be referred to. The lubricant may be included in the non-magnetic layer which will be described later. For the lubricant which may be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be added to a non-magnetic layer forming composition. For the dispersing agent which can be added to the non-magnetic layer forming composition, a description disclosed in paragraph 0061 of JP2012-133837A can be referred to. As the non-magnetic powder which may be included in the magnetic layer, non-magnetic powder which can function as an abrasive, non-magnetic powder (for example, non-magnetic colloid particles) which can function as a projection formation agent which forms projections suitably protruded from the surface of the magnetic layer, and the like can be used. For example, for the abrasive, a description disclosed in paragraphs 0030 to 0032 of JP2004-273070A can be referred to. As the projection formation agent, colloidal particles are preferable, and from a viewpoint of availability, inorganic colloidal particles are preferable, inorganic oxide colloidal particles are more preferable, and silica colloidal particles (colloidal silica) are even more preferable. Average particle sizes of the abrasive and the projection formation agent are respectively preferably 30 to 200 nm and more preferably 50 to 100 nm.

The magnetic layer described above can be provided on the surface of the non-magnetic support directly or indirectly through the non-magnetic layer.

Non-Magnetic Layer

Next, the non-magnetic layer will be described. The magnetic tape may include a magnetic layer directly on the surface of the non-magnetic support or may include a magnetic layer on the surface of the non-magnetic support through the non-magnetic layer including the non-magnetic powder. The non-magnetic powder used in the non-magnetic layer may be a powder of an inorganic substance or a powder of an organic substance. In addition, carbon black and the like can be used. Examples of powder of the inorganic substance include powder of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50% to 90% by mass and more preferably 60% to 90% by mass with respect to a total mass of the non-magnetic layer.

The non-magnetic layer can include a binding agent and can also include additives. In regards to other details of a binding agent and additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Back Coating Layer

The magnetic tape may or may not include a back coating layer including a non-magnetic powder on a surface side of the non-magnetic support opposite to the surface side provided with the magnetic layer. The back coating layer preferably includes any one or both of carbon black and inorganic powder. The back coating layer can include a binding agent and can also include additives. In regards to the binding agent included in the back coating layer and additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

Regarding a thickness (total thickness) of the magnetic tape, it has been required to increase recording capacity (increase in capacity) of the magnetic tape along with the enormous increase in information content in recent years. As a unit for increasing the capacity, a thickness of the magnetic tape is reduced (hereinafter, also referred to as "thinning") and a length of the magnetic tape accommodated in one reel of the magnetic tape cartridge is increased. From this point, the thickness (total thickness) of the magnetic tape is preferably 5.6 µm or less, more preferably 5.5 µm or less, even more preferably 5.4 µm or less, and still preferably 5.3 µm or less. In addition, from a viewpoint of ease of handling, the thickness of the magnetic tape is preferably 3.0 µm or more and more preferably 3.5 µm or more.

The thickness (total thickness) of the magnetic tape can be measured by the following method.

Ten tape samples (for example, length of 5 to 10 cm) are cut out from a random portion of the magnetic tape, these tape samples are stacked, and the thickness is measured. A value which is one tenth of the measured thickness (thickness per tape sample) is set as the tape thickness. The thickness measurement can be performed using a well-known measurement device capable of performing the thickness measurement at 0.1 µm order.

A thickness of the non-magnetic support is preferably 3.0 to 5.0 µm.

A thickness of the magnetic layer can be optimized according to a saturation magnetization amount of a magnetic head used, a head gap length, a recording signal band, and the like, is normally 0.01 µm to 0.15 µm, and is preferably 0.02 µm to 0.12 µm and more preferably 0.03 µm to 0.1 µm, from a viewpoint of realization of high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.1 to 1.5 µm and is preferably 0.1 to 1.0 µm.

A thickness of the back coating layer is preferably 0.9 µm or less and more preferably 0.1 to 0.7 µm.

Various thicknesses such as the thickness of the magnetic layer and the like can be obtained by the following method.

A cross section of the magnetic tape in the thickness direction is exposed with an ion beam and the cross section observation of the exposed cross section is performed using a scanning electron microscope. Various thicknesses can be obtained as the arithmetic mean of the thicknesses obtained at two random portions in the cross section observation. Alternatively, various thicknesses can be obtained as a designed thickness calculated under the manufacturing conditions.

Manufacturing Step

Preparation of Each Layer Forming Composition

Composition for forming the magnetic layer, the non-magnetic layer, or the back coating layer generally includes a solvent, together with the various components described above. As the solvent, one kind or two or more kinds of various kinds of solvents usually used for producing a coating type magnetic recording medium can be used. The content of the solvent in each layer forming composition is not particularly limited. For the solvent, a description disclosed in a paragraph 0153 of JP2011-216149A can be referred to. A concentration of solid content and a solvent composition in each layer forming composition may be suitably adjusted according to handleability of the composition, coating conditions, and a thickness of each layer to be formed. A step of preparing a composition for forming the magnetic layer, the non-magnetic layer or the back coating layer can generally include at least a kneading step, a dispersing step, and a mixing step provided before and after these steps, in a case where necessary. Each step may be divided into two or more stages. Various components used in the preparation of each layer forming composition may be added at the beginning or during any step. In addition, each component may be separately added in two or more steps. For example, a binding agent may be separately added in a kneading step, a dispersing step, and a mixing step for adjusting viscosity after the dispersion. In the manufacturing step of the magnetic tape, a well-known manufacturing technology of the related art can be used as a part of step. In the kneading step, an open kneader, a continuous kneader, a pressure kneader, or a kneader having a strong kneading force such as an extruder can be used. The details of the kneading step are disclosed in JP1989-106338A (JP-H01-106338A) and JP1989-79274A (JP-H01-79274A). As a disperser, various well-known dispersers using a shear force such as a beads mill, a ball mill, a sand mill, or a homogenizer can be used. In the dispersion, the dispersion beads can be preferably used. As dispersion beads, ceramic beads or glass beads are used and zirconia beads are preferable. A combination of two or more kinds of beads may be used. A bead diameter (particle diameter) and a bead filling percentage of the dispersion beads are not particularly limited and may be set according to powder which is a dispersion target. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

Coating Step

The magnetic layer can be formed by directly applying the magnetic layer forming composition onto the surface of the non-magnetic support or performing multilayer coating of the magnetic layer forming composition with the non-magnetic layer forming composition in order or at the same time. The back coating layer can be formed by applying the back coating layer forming composition onto the surface of the non-magnetic support opposite to the surface provided with the non-magnetic layer and/or the magnetic layer (or non-magnetic layer and/or the magnetic layer is to be provided). For details of the coating for forming each layer, a description disclosed in a paragraph 0066 of JP2010-231843A can be referred to.

Other Steps

For various other steps for manufacturing the magnetic tape, a well-known technology can be applied. For details of the various steps, descriptions disclosed in paragraphs 0067 to 0070 of JP2010-231843A can be referred to, for example. For example, the coating layer of the magnetic layer forming composition can be subjected to an alignment process in an alignment zone, while the coating layer is wet. For the alignment process, various well-known technologies disclosed in a paragraph 0052 of JP2010-24113A can be applied. For example, a homeotropic alignment process can be performed by a well-known method such as a method using a different polar facing magnet. In the alignment zone, a drying speed of the coating layer can be controlled by a temperature and an air flow of the dry air and/or a transporting rate in the alignment zone. In addition, the coating layer may be preliminarily dried before transporting to the alignment zone. As an example, the magnetic field strength in a homeotropic alignment process can be 0.1 to 1.5 T.

Regarding the magnetic tape, a long magnetic tape raw material can be obtained through various steps. The obtained magnetic tape raw material is cut (slit) by a well-known cutter to have a width of a magnetic tape to be wound around the magnetic tape cartridge. The width is determined according to the standard and is, for example, ½ inches. ½ inches=12.65 mm. Generally, in the magnetic tape obtained by slitting, a servo pattern can be formed. The formation of the servo pattern will be described later in detail.

Heat Treatment

In the one embodiment, the magnetic tape can be a magnetic tape manufactured through the following heat treatment. In another embodiment, the magnetic tape can be manufactured without the following heat treatment. The performing of the heat treatment can lead to decreasing the values of the magnetic tape maximum deformation amount after storage in five environments for 1 year, the rate of the change of the magnetic tape deformation amount with respect to the relative humidity, and the rate of the change of the magnetic tape deformation amount with respect to the temperature.

As the heat treatment, the magnetic tape slit and cut to have a width determined according to the standard described above can be wound around a core member and can be subjected to the heat treatment in the wound state.

In the one embodiment, the heat treatment is performed in a state where the magnetic tape is wound around the core member for heat treatment (hereinafter, referred to as a "winding core for heat treatment"), the magnetic tape after the heat treatment is wound around a cartridge reel of the magnetic tape cartridge, and a magnetic tape cartridge in which the magnetic tape is wound around the cartridge reel can be manufactured.

The winding core for heat treatment can be formed of metal, a resin, or paper. The material of the winding core for heat treatment is preferably a material having high stiffness, from a viewpoint of preventing the occurrence of a winding defect such as spoking or the like. From this viewpoint, the winding core for heat treatment is preferably formed of metal or a resin. In addition, as an indicator for stiffness, a bending elastic modulus of the material for the winding core for heat treatment is preferably equal to or greater than 0.2 GPa and more preferably equal to or greater than 0.3 GPa. Meanwhile, since the material having high stiffness is normally expensive, the use of the winding core for heat treatment of the material having stiffness exceeding the stiffness capable of preventing the occurrence of the winding defect causes the cost increase. By considering the viewpoint described above, the bending elastic modulus of the material for the winding core for heat treatment is preferably equal to or smaller than 250 GPa. In addition, the winding core for heat treatment can be a solid or hollow core member. In a case of a hollow shape, a wall thickness is preferably equal to or greater than 2 mm, from a viewpoint of maintaining the stiffness. In addition, the winding core for heat treatment may include or may not include a flange.

The magnetic tape having a length equal to or greater than a length to be finally accommodated in the magnetic tape cartridge (hereinafter, referred to as a "final product length") is prepared as the magnetic tape wound around the winding core for heat treatment, and it is preferable to perform the heat treatment by placing the magnetic tape in the heat treatment environment, in a state where the magnetic tape is wound around the winding core for heat treatment. The magnetic tape length wound around the winding core for heat treatment is equal to or greater than the final product length, and is preferably the "final product length+α", from a viewpoint of ease of winding around the winding core for heat treatment. This α is preferably equal to or greater than 5 m, from a viewpoint of ease of the winding. The tension in a case of winding around the winding core for heat treatment is preferably equal to or greater than 0.10 N. In addition, from a viewpoint of preventing the occurrence of excessive deformation during the manufacturing, the tension in a case of winding around the winding core for heat treatment is preferably equal to or smaller than 1.50 N and more preferably equal to or smaller than 1.00 N. An outer diameter of the winding core for heat treatment is preferably equal to or greater than 20 mm and more preferably equal to or greater than 40 mm, from viewpoints of ease of the winding and preventing coiling (curl in longitudinal direction). The outer diameter of the winding core for heat treatment is preferably equal to or smaller than 100 mm and more preferably equal to or smaller than 90 mm. A width of the winding core for heat treatment may be equal to or greater than the width of the magnetic tape wound around this winding core. In addition, after the heat treatment, in a case of detaching the magnetic tape from the winding core for heat treatment, it is preferable that the magnetic tape and the winding core for heat treatment are sufficiently cooled and magnetic tape is detached from the winding core for heat treatment, in order to prevent the occurrence of the tape deformation which is not intended during the detaching operation. It is preferable the detached magnetic tape is wound around another winding core temporarily (referred to as a "winding core for temporary winding"), and the magnetic tape is wound around a cartridge reel (generally, an outer diameter is approximately 40 to 50 mm) of the magnetic tape cartridge from the winding core for temporary winding. Accordingly, a relationship between the inside and the outside with respect to the winding core for heat treatment of the magnetic tape in a case of the heat treatment can be maintained and the magnetic tape can be wound around the cartridge reel of the magnetic tape cartridge. Regarding the details of the winding core for temporary winding and the tension in a case of winding the magnetic tape around the winding core, the description described above regarding the winding core for heat treatment can be referred to. In an embodiment in which the heat treatment is subjected to the magnetic tape having a length of the "final product length+ α", the length corresponding to "+α" may be cut in any stage. For example, in one embodiment, the magnetic tape having the final product length may be wound around the reel of the magnetic tape cartridge from the winding core for temporary winding and the remaining length corresponding the "+α" may be cut. From a viewpoint of decreasing the amount of the portion to be cut out and removed, the α is preferably equal to or smaller than 20 m.

The specific embodiment of the heat treatment performed in a state of being wound around the core member as described above is described below.

An atmosphere temperature for performing the heat treatment (hereinafter, referred to as a "heat treatment temperature") is preferably equal to or higher than 40° C. and more preferably equal to or higher than 50° C. On the other hand, from a viewpoint of preventing the excessive deformation, the heat treatment temperature is preferably equal to or lower than 75° C., more preferably equal to or lower than 70° C., and even more preferably equal to or lower than 65° C.

A weight absolute humidity of the atmosphere for performing the heat treatment is preferably equal to or greater than 0.1 g/kg Dry air and more preferably equal to or greater than 1 g/kg Dry air. The atmosphere in which the weight absolute humidity is in the range described above is preferable, because it can be prepared without using a special device for decreasing moisture. On the other hand, the weight absolute humidity is preferably equal to or smaller than 70 g/kg Dry air and more preferably equal to or smaller than 66 g/kg Dry air, from a viewpoint of preventing a deterioration in workability by dew condensation. The heat treatment time is preferably equal to or longer than 0.3 hours and more preferably equal to or longer than 0.5 hours. In addition, the heat treatment time is preferably equal to or shorter than 48 hours, from a viewpoint of production efficiency.

Formation of Servo Pattern

The magnetic tape has a plurality of servo bands in the magnetic layer. The servo band is configured of servo patterns continuous in the longitudinal direction of the magnetic tape. The servo pattern can enable tracking control of the magnetic head, control of the running speed of the magnetic tape, and the like in the magnetic recording and reproducing device for the magnetic tape. The "formation of the servo pattern" can be "recording of a servo signal". For example, the dimension information of the magnetic tape in the width direction during the running can be obtained using a servo signal, and the dimension of the magnetic tape in the width direction can be controlled by adjusting and changing the tension applied in the longitudinal direction of the magnetic tape according to the obtained dimension information.

The formation of the servo pattern will be described below.

The servo pattern is generally formed along a longitudinal direction of the magnetic tape. As a system of control using a servo signal (servo control), timing-based servo (TBS), amplitude servo, or frequency servo is used.

As shown in European Computer Manufacturers Association (ECMA)-319 (June 2001), a timing-based servo system is used in a magnetic tape based on a linear-tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. The servo system is a system of performing head tracking using a servo signal. In the invention and the specification, the "timing-based servo pattern" refers to a servo pattern that enables head tracking in a servo system of a timing-based servo system. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a spacing thereof is continuously changed along the width direction of the magnetic tape, and a relative position of the servo pattern and the servo signal reading element can be recognized, by the reading of the spacing thereof by the servo signal reading element. The information of this relative position can realize the tracking of a data track. Accordingly, a plurality of servo tracks are generally set on the servo pattern along the width direction of the magnetic tape.

The servo band is configured of servo patterns continuous in the longitudinal direction of the magnetic tape. The magnetic tape has a plurality of servo bands in the magnetic layer. For example, the number thereof is 5 in the LTO tape. A region interposed between two adjacent servo bands is a data band. The data band is configured of a plurality of data tracks and each data track corresponds to each servo track.

In one embodiment, as shown in JP2004-318983A, information showing the number of servo bands (also referred to as "servo band identification (ID)" or "Unique Data Band Identification Method (UDIM) information") is embedded in each servo band. This servo band ID is recorded by shifting a specific servo stripe among the plurality of pairs of servo stripes in the servo band so that the position thereof is relatively displaced in the longitudinal direction of the magnetic tape. Specifically, the position of the shifted specific servo stripe among the plurality of pairs of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 (June 2001) is used. In this staggered method, a plurality of the groups of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319 (June 2001), information showing the position in the longitudinal direction of the magnetic tape (also referred to as "Longitudinal Position (LPOS) information") is normally embedded in each servo band. This LPOS information is recorded so that the position of one pair of servo stripes is shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head generally includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo pattern to be formed. The width of each gap can be set as, for example, equal to or smaller than 1 μm, 1 to 10 μm, or equal to or greater than 10 μm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowly decreasing an intensity of the magnetic field, while reversing a direction of the magnetic field applied to the magnetic tape. Meanwhile, the DC erasing is performed by applying the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing is opposite to each other. Accordingly, the output of the servo signal obtained by the reading of the servo pattern can be increased. As disclosed in JP2012-53940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

Generally, after forming the servo pattern, the magnetic tape is wound around the reel hub of the cartridge reel and accommodated in the magnetic tape cartridge.

Vertical Squareness Ratio

In the one embodiment, the vertical squareness ratio of the magnetic tape can be, for example, 0.55 or more, and is preferably 0.60 or more. It is preferable that the vertical squareness ratio of the magnetic tape is 0.60 or more, from a viewpoint of improving the electromagnetic conversion characteristics. In principle, an upper limit of the squareness ratio is 1.00 or less. The vertical squareness ratio of the magnetic tape can be 1.00 or less, 0.95 or less, 0.90 or less, 0.85 or less, or 0.80 or less. It is preferable that the value of the vertical squareness ratio of the magnetic tape is large from a viewpoint of improving the electromagnetic conversion characteristics. The vertical squareness ratio of the magnetic tape can be controlled by a well-known method such as performing a homeotropic alignment process.

In the invention and the specification, the "vertical squareness ratio" is squareness ratio measured in the vertical direction of the magnetic tape. The "vertical direction" described with respect to the squareness ratio is a direction orthogonal to the surface of the magnetic layer, and can also be referred to as a thickness direction. In the invention and the specification, the vertical squareness ratio is obtained by the following method.

A sample piece having a size that can be introduced into an oscillation sample type magnetic-flux meter is cut out from the magnetic tape to be measured. Regarding the sample piece, using the oscillation sample type magnetic-flux meter, a magnetic field is applied to a vertical direction of a sample piece (direction orthogonal to the surface of the magnetic layer) with a maximum applied magnetic field of 3979 kA/m, a measurement temperature of 296 K, and a magnetic field sweep speed of 8.3 kA/m/sec, and a magnetization strength of the sample piece with respect to the applied magnetic field is measured. The measured value of the magnetization strength is obtained as a value after diamagnetic field correction and a value obtained by subtracting magnetization of a sample probe of the oscillation sample type magnetic-flux meter as background noise. In a case where the magnetization strength at the maximum applied magnetic field is Ms and the magnetization strength at zero applied magnetic field is Mr, the squareness ratio SQ is a value calculated as SQ=Mr/Ms. The measurement temperature is referred to as a temperature of the sample piece, and by setting the ambient temperature around the sample piece to a measurement temperature, the temperature of the sample piece can be set to the measurement temperature by realizing temperature equilibrium.

Magnetic Head

According to another aspect of the invention, there is provided a magnetic recording and reproducing device comprising the magnetic tape cartridge. In the invention and the specification, the "magnetic recording and reproducing device" means a device capable of performing at least one of the recording of data on the magnetic tape or the reproducing of data recorded on the magnetic tape. The device is commonly referred to as a drive and typically includes a magnetic head. The magnetic tape cartridge can be inserted into the magnetic recording and reproducing device, and the magnetic tape can be run in the magnetic recording and reproducing device to record data on the magnetic tape and/or reproduce the recorded data by the magnetic head. The magnetic head included in the magnetic recording and reproducing device can be a recording head capable of performing the recording of data on the magnetic tape, and can also be a reproducing head capable of performing the reproducing of data recorded on the magnetic tape. In addition, in the embodiment, the magnetic recording and reproducing device can include both of a recording head and a reproducing head as separate magnetic heads. In another embodiment, the magnetic head included in the magnetic recording and reproducing device may have a configuration in which both the recording element and the reproducing element are comprised in one magnetic head. As the reproducing head, a magnetic head (MR head) including a magnetoresistive (MR) element capable of reading information recorded on the magnetic tape with excellent sensitivity as the reproducing element is preferable. As the MR head, various well-known MR heads (for example, a Giant Magnetoresistive (GMR) head, or a Tunnel Magnetoresistive (TMR) head) can be used. In addition, the magnetic head which performs the recording of data and/or the reproducing of data may include a servo pattern reading element. Alternatively, as a head other than the magnetic head which performs the recording of data and/or the reproducing of data, a magnetic head (servo head) including a servo pattern reading element may be included in the magnetic recording and reproducing device. For example, the magnetic head which performs the recording of data and/or reproducing of the recorded data (hereinafter, also referred to as a "recording and reproducing head") can include two servo signal reading elements, and each of the two servo signal reading elements can read two adjacent servo bands with the data band interposed therebetween at the same time. One or a plurality of elements for data can be disposed between the two servo signal reading elements. The element for recording data (recording element) and the element for reproducing data (reproducing element) are collectively referred to as "elements for data".

By reproducing data using the reproducing element having a narrow reproducing element width as the reproducing element, the data recorded at high density can be reproduced with high sensitivity. From this viewpoint, the reproducing element width of the reproducing element is preferably 0.8 μm or less. The reproducing element width of the reproducing element can be, for example, 0.1 μm or more. However, it is also preferable to fall below this value from the above viewpoint.

On the other hand, as the reproducing element width decreases, a phenomenon such as reproducing failure due to off-track is more likely to occur. In order to suppress the occurrence of such a phenomenon, it is preferable to use a magnetic recording and reproducing device that controls the dimension of the magnetic tape in the width direction by adjusting and changing the tension applied in the longitudinal direction of the magnetic tape during the running.

Here, the "reproducing element width" refers to a physical dimension of the reproducing element width. Such physical dimensions can be measured with an optical microscope, a scanning electron microscope, or the like.

In a case of recording data and/or reproducing recorded data, first, head tracking can be performed using a servo signal. That is, as the servo signal reading element follows a predetermined servo track, the element for data can be controlled to pass on the target data track. The movement of the data track is performed by changing the servo track to be read by the servo signal reading element in the tape width direction.

In addition, the recording and reproducing head can perform the recording and/or reproducing with respect to other data bands. In this case, the servo signal reading element is moved to a predetermined servo band by using the UDIM information described above, and the tracking with respect to the servo band may be started.

Figure 5:
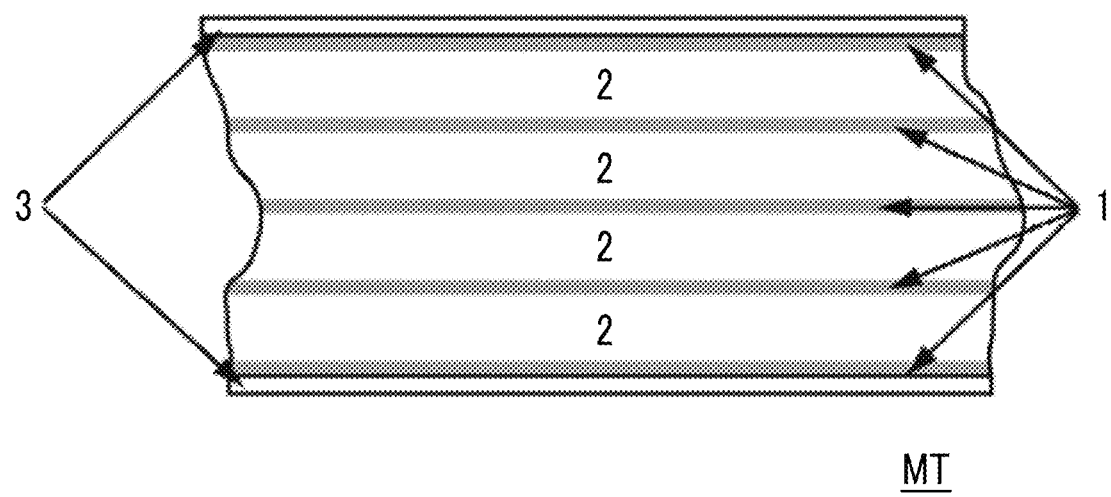
FIG. 5 shows an example of disposition of data bands and servo bands.

FIG. 5 shows an example of disposition of data bands and servo bands. In FIG. 5, a plurality of servo bands 1 are disposed to be interposed between guide bands 3 in a magnetic layer of a magnetic tape MT. A plurality of regions 2 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 6 are formed on a servo band, in a case of manufacturing a magnetic tape. Specifically, in FIG. 6, a servo frame SF on the servo band 1 is configured with a servo sub-frame 1 (SSF1) and a servo sub-frame 2 (SSF2). The servo sub-frame 1 is configured with an A burst (in FIG. 6, reference numeral A) and a B burst (in FIG. 6, reference numeral B). The A burst is configured with servo patterns A1 to A5 and the B burst is configured with servo patterns B1 to B5. Meanwhile, the servo sub-frame 2 is configured with a C burst (in FIG. 6, reference numeral C) and a D burst (in FIG. 6, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for identifying the servo frames. FIG. 6 shows one servo frame for explaining. However, in practice, in the magnetic layer of the magnetic tape in which the head tracking in the timing-based servo system is performed, a plurality of servo frames are disposed in each servo band in a running direction. In FIG. 6, an arrow shows the running direction. For example, an LTO Ultrium format tape generally includes 5,000 or more servo frames per a tape length of 1 m, in each servo band of the magnetic layer.

EXAMPLES

Hereinafter, the invention will be described with reference to examples. However, the invention is not limited to the embodiments shown in the examples. "Parts" and "%" in the following description mean "parts by mass" and "% by mass", unless otherwise noted. "eq" indicates equivalent and a unit not convertible into SI unit.

In addition, various steps and operations described below were performed in an environment of a temperature of 20° C. to 25° C. and a relative humidity of 40% to 60%, unless otherwise noted.

Non-Magnetic Support

In Table 1, "PEN" indicates a polyethylene naphthalate support, "PET" indicates a polyethylene terephthalate support, and "PA" indicates an aromatic polyamide support. The moisture content and the Young's modulus in Table 1 is a value measured by the method described above.

Ferromagnetic Powder

In Table 1, "BaFe" in a column of the type of the ferromagnetic powder is a hexagonal barium ferrite powder having an average particle size (average plate diameter) of 21 nm.

In Table 1, "SrFe1" of the column of the type of ferromagnetic powder indicates a hexagonal strontium ferrite powder produced as follows.

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a melting temperature of 1,390° C., and a tap hole provided on the bottom of the platinum crucible was heated while stirring the melt, and the melt was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1,000 g of zirconia beads having a particle diameter of 1 mm, and 800 mL of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 18 nm, an activation volume was 902 $nm^3$, an anisotropy constant Ku was $2.2 \times 10^5$ $J/m^3$, and a mass magnetization σs was 49 $A \times m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the conditions of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degree In Table 1, "SrFe2" of the column of the type of ferromagnetic powder indicates a hexagonal strontium ferrite powder produced as follows.

1,725 g of $SrCO_3$, 666 g of $H_3BO_3$, 1,332 g of $Fe_2O_3$, 52 g of $Al(OH)_3$, 34 g of $CaCO_3$, and 141 g of $BaCO_3$ were weighed and mixed in a mixer to obtain a raw material mixture.

The obtained raw material mixture was dissolved in a platinum crucible at a melting temperature of 1,380° C., and a tap hole provided on the bottom of the platinum crucible was heated while stirring the melt, and the melt was tapped in a rod shape at approximately 6 g/sec. The tap liquid was rolled and cooled with a water cooling twin roller to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1,000 g of zirconia beads having a particle diameter of 1 mm, and 800 mL of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 19 nm, an activation volume was 1,102 nm$^3$, an anisotropy constant Ku was 2.0×10$^5$ J/m$^3$, and a mass magnetization as was 50 A×m$^2$/kg.

In Table 1, "ε-iron oxide" of the column of the type of ferromagnetic powder indicates an ε-iron oxide powder produced as follows.

4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. An aqueous solution of citric acid obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1,000° C. was filled with the obtained precursor of ferromagnetic powder in the atmosphere and subjected to heat treatment for 4 hours.

The heat-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the heat-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide (ε-Ga$_{0.28}$Co$_{0.05}$Ti$_{0.05}$Fe$_{1.62}$O$_3$) was obtained. In addition, the X-ray diffraction analysis was performed under the same conditions as the conditions described regarding the hexagonal strontium ferrite powder SrFe1 in advance, and it was confirmed that the obtained ferromagnetic powder has a crystal structure of a single phase which is an ε phase not including a crystal structure of an α phase and a γ phase (ε-iron oxide type crystal structure) from the peak of the X-ray diffraction pattern.

Regarding the obtained ε-iron oxide powder, an average particle size was 12 nm, an activation volume was 746 nm$^3$, an anisotropy constant Ku was 1.2×10$^5$ J/m$^3$, and a mass magnetization σs was 16 A×m$^2$/kg.

The activation volume and the anisotropy constant Ku of the hexagonal strontium ferrite powder and the ε-iron oxide powder are values obtained by the method described above regarding each ferromagnetic powder by using an oscillation sample type magnetic-flux meter (manufactured by Toei Industry Co., Ltd.).

In addition, the mass magnetization σs is a value measured at the magnetic field strength of 1,194 kA/m (15 kOe) by using an oscillation sample type magnetic-flux meter (manufactured by Toei Industry Co., Ltd.).

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin including a SO$_3$Na group as a polar group (UR-4800 manufactured by Toyobo Co., Ltd. (polar group amount: 80 meq/kg)), and 570.0 parts of a mixed solvent solution of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of approximately 65% and a Brunauer-Emmett-Teller (BET) specific surface area of 20 m$^2$/g, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List

Magnetic liquid

Ferromagnetic powder (see Table 1): 100.0 parts

SO$_3$Na group-containing polyurethane resin: 14.0 parts

Weight-average molecular weight: 70,000, SO$_3$Na group: 0.2 meq/g

Cyclohexanone: 150.0 parts

Methyl ethyl ketone: 150.0 parts

Abrasive solution

Alumina dispersion prepared in the section (1): 6.0 parts

Silica sol (projection formation agent liquid)

Colloidal silica (Average particle size: 120 nm): 2.0 parts

Methyl ethyl ketone: 1.4 parts

Other components

Stearic acid: 2.0 parts

Stearic acid amide: 0.2 parts

Butyl stearate: 2.0 parts

Polyisocyanate (CORONATE (registered product) L manufactured by Tosoh Corporation): 2.5 parts Finishing additive solvent Cyclohexanone: 200.0 parts Methyl ethyl ketone: 200.0 parts (3) Non-Magnetic Layer Forming Composition List
Non-magnetic inorganic powder: α-iron oxide: 100.0 parts
Average particle size (average major axis length): 0.15 μm
Average acicular ratio: 7
BET specific surface area: 52 m$^2$/g
Carbon black: 20.0 parts
Average particle size: 20 nm
SO$_3$Na group-containing polyurethane resin: 18.0 parts
Weight-average molecular weight: 70,000, SO$_3$Na group: 0.2 meq/g
Stearic acid: 2.0 parts
Stearic acid amide: 0.2 parts
Butyl stearate: 2.0 parts
Cyclohexanone: 300.0 parts
Methyl ethyl ketone: 300.0 parts
(4) Back Coating Layer Forming Composition List
Carbon black: 100.0 parts
DBP (Dibutyl phthalate) oil absorption: 74 cm$^3$/100 g
Nitrocellulose: 27.0 parts
Polyester polyurethane resin including sulfonic acid group and/or salt thereof: 62.0 parts
Polyester resin: 4.0 parts
Alumina powder (BET specific surface area: 17 m$^2$/g): 0.6 parts
Methyl ethyl ketone: 600.0 parts
Toluene: 600.0 parts
Polyisocyanate (CORONATE (registered product) L manufactured by Tosoh Corporation): 15.0 parts (5) Preparation of Each Layer Forming Composition The magnetic layer forming composition was prepared by the following method. The magnetic liquid was prepared by dispersing (beads-dispersing) each component by using a batch type vertical sand mill for 24 hours. As dispersion beads, zirconia beads having a bead diameter of 0.5 mm were used. The prepared magnetic liquid, the abrasive solution, and other components (silica sol, other components, and finishing additive solvent) were mixed with each other and beads-dispersed for 5 minutes by using the sand mill, and the treatment (ultrasonic dispersion) was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared.

The non-magnetic layer forming composition was prepared by the following method. The components described above excluding lubricant (stearic acid, stearic acid amide, and butyl stearate) were kneaded and diluted by an open kneader, and subjected to a dispersion process with a transverse beads mill disperser. After that, the lubricant (stearic acid, stearic acid amide, and butyl stearate) was added, and stirred and mixed with a dissolver stirrer, and a non-magnetic layer forming composition was prepared.

The back coating layer forming composition was prepared by the following method. The components excluding polyisocyanate were introduced in a dissolver stirrer and stirred at a circumferential speed of 10 msec for 30 minutes, and the dispersion process was performed with a transverse beads mill disperser. After that, polyisocyanate was added, and stirred and mixed with a dissolver stirrer, and a back coating layer forming composition was prepared.

(6) Manufacturing Method of Magnetic Tape and Magnetic Tape Cartridge

The non-magnetic layer forming composition prepared in the section (5) was applied to a surface of a biaxial stretched support having a thickness of 4.0 μm described in Table 1 so that the thickness after the drying becomes 1.0 μm and was dried to form a non-magnetic layer. Then, the magnetic layer forming composition prepared in the section (5) described above was applied onto the non-magnetic layer so that the thickness after the drying is 0.1 μm, and a coating layer was formed. After that, a homeotropic alignment process was performed by applying a magnetic field having a magnetic field strength of 0.3 T in a vertical direction with respect to a surface of a coating layer, while the coating layer of the magnetic layer forming composition is not dried. Then, the drying was performed to form the magnetic layer. After that, the back coating layer forming composition prepared in the section (5) described above was applied to the surface of the support made of polyethylene naphthalate on a side opposite to the surface where the non-magnetic layer and the magnetic layer were formed, so that the thickness after the drying becomes 0.5 μm, and was dried to form a back coating layer.

After that, a surface smoothing treatment (calender process) was performed by using a calender roll configured of only a metal roll, at a speed of 100 m/min, linear pressure of 300 kg/cm), and a calender temperature (surface temperature of a calender roll) of 90° C.

Then, the heat treatment was performed by storing the long magnetic tape raw material in a heat treatment furnace at the atmosphere temperature of 70° C. (heat treatment time: 36 hours). After the heat treatment, the magnetic tape was obtained by slitting to have a width of ½ inches. By recording a servo signal on a magnetic layer of the obtained magnetic tape with a commercially available servo writer, the magnetic tape including a data band, a servo band, and a guide band in the disposition according to a linear-tape-open (LTO) Ultrium format, and including a servo pattern (timing-based servo pattern) having the disposition and shape according to the LTO Ultrium format on the servo band was obtained.

The servo pattern formed by doing so is a servo pattern disclosed in Japanese Industrial Standards (JIS) X6175:2006 and Standard ECMA-319 (June 2001).

The total number of servo bands is five, and the total number of data bands is four.

The magnetic tape (length of 970 m) after the servo pattern formation was wound around the winding core for heat treatment, and the heat treatment was performed in a state of being wound around this winding core. As the winding core for heat treatment, a solid core member (outer diameter: 50 mm) formed of a resin and having 0.8 GPa of a bending elastic modulus was used, and the tension in a case of the winding was set as 0.60 N. The heat treatment was performed at the heat treatment temperature shown in Table 1 for 5 hours. The weight absolute humidity in the atmosphere in which the heat treatment was performed was 10 g/kg Dry air.

After the heat treatment, the magnetic tape and the winding core for heat treatment were sufficiently cooled, the magnetic tape was detached from the winding core for heat treatment and wound around the winding core for temporary winding, and then, the magnetic tape having the final product length (960 m) was wound around the reel hub of the reel of the magnetic tape cartridge from the winding core for temporary winding by applying the tension having a value described in the section of "winding tension during manufacture" of Table 1 in the longitudinal direction of the magnetic tape, and the remaining length of 10 m was cut out and the leader tape based on section 9 of Standard European Computer Manufacturers Association (ECMA)-319 (June 2001) Section 3 was bonded to the terminal of the cut side by using a commercially available splicing tape.

As the winding core for temporary winding, a solid core member having the same outer diameter and formed of the same material as the winding core for heat treatment was used.

As the magnetic tape cartridge accommodating the magnetic tape described above, a single reel type magnetic tape cartridge having the configuration shown in FIG. 2 was used. The reel hub of this magnetic tape cartridge is a single-layer structure reel hub (thickness: 2.5 mm, outer diameter: 44 mm) obtained by injection molding glass fiber reinforced polycarbonate. The glass fiber content of this glass fiber reinforced polycarbonate is the value (unit: % by mass) shown in Table 1. A part of the glass fiber reinforced polycarbonate for injection molding was collected, and according to JIS K 7171: 2016 section 6.3.1 (preparation from molding material), it is described in the same JIS section 6.1.2. The recommended test pieces were prepared, and the bending elastic modulus (arithmetic mean of 5 test pieces) was calculated according to the same JIS, and a value shown in Table 1 was obtained. In the examples and comparative examples described below, the bending elastic modulus of the reel hub material was determined by the above method. The bending elastic modulus of the winding core for heat treatment is also a value obtained in the same manner.

As described above, a single reel type magnetic tape cartridge of Example 1 in which a magnetic tape having a length of 960 m was wound around a reel was manufactured.

Examples 2 to 26 and Comparative Examples 1 to 11

A magnetic tape cartridge was produced by the method as in Example 1, except that various conditions shown in Table 1 were changed as shown in sections of Table 1.

In the comparative examples in which "none" is described in the column of "heat treatment temperature" in Table 1, the magnetic tape having a final product length of 960 m was accommodated in the magnetic tape cartridge, without performing the heat treatment in a state of being wound around the winding core for heat treatment.

In each of the examples and comparative examples, three magnetic tape cartridges were produced, one was used for the evaluation of the following magnetic tape deformation amount and the evaluation of the tape thickness, and the other was used for the evaluation of the recording and reproducing performance which will be described later, and the remaining one was used for the evaluation of running stability which will be described later.

Evaluation Method

Magnetic Tape Maximum Deformation Amount After Storage in Five Environments for 1 Year The magnetic tape cartridge to be measured was placed in a measurement environment of an atmosphere temperature of 23° C. and a relative humidity of 50% for 5 days in order to make it familiar with the measurement environment.

After that, in the measurement environment, in the magnetic recording and reproducing device shown in FIG. 1, the magnetic tape was allowed to run in a state where a tension of 0.70 N was applied in the longitudinal direction of the magnetic tape. For such running, the spacing between two servo bands adjacent to each other with a data band interposed therebetween was measured at spacing of 1 m over the entire length of the magnetic tape. The measurement was made for all servo band spacings. The servo band spacing measured in this way was referred to as a "servo band spacing before storage" at each measurement position. The spacing between two servo bands adjacent to each other with the data band interposed therebetween was calculated as follows.

In order to obtain the spacing between two servo bands adjacent to each other with the data band interposed therebetween, the dimensions of the servo pattern are required. The standard of the dimension of the servo pattern varies depending on generation of LTO. Therefore, first, an average distance AC between the corresponding four stripes of the A burst and the C burst and an azimuth angle α of the servo pattern are measured using a magnetic force microscope or the like.

Next, the servo pattern formed on the magnetic tape is read sequentially along the tape longitudinal direction by using a reel tester and a servo head including two servo signal reading elements fixed in the spacing in the direction orthogonal to the longitudinal direction of the magnetic tape (hereinafter, one is referred to as an upper side and the other one is referred to as a lower side). An average time between 5 stripes corresponding to the A burst and the B burst over the length of 1 LPOS word is defined as a. An average time between 4 stripes corresponding to the A burst and the C burst over the length of 1 m is defined as b. At this time, the value defined by $AC \times (1/2 - a/b)/(2 \times \tan(\alpha))$ represents a reading position PES in the width direction based on the servo signal obtained by the servo signal reading element. The reading of the servo pattern is simultaneously performed by the two upper side and lower side servo signal reading elements. The value of the PES obtained by the upper side servo signal reading element is set as PES1, and the value of the PES obtained by the lower side servo signal reading element is set as PES2. As "PES2−PES1", the spacing between two servo bands adjacent to each other with the data band interposed therebetween can be obtained. This is because the upper side and lower side servo pattern reading elements are fixed to the servo head and their spacings do not change.

After that, the magnetic tape cartridge was stored for 1 year in the five environments of the "environment of a temperature of 16° C. and relative humidity of 20%", the "environment of a temperature of 16° C. and relative humidity of 80% environment", the "environment of a temperature of 26° C. and relative humidity of 80%", the "environment of a temperature of 32° C. and relative humidity of 20%", and the "environment of a temperature of 32° C. and relative humidity of 55%", and the servo band spacing after storage for 1 year was measured. The storage in the five environments is performed in the order of the "environment of a temperature of 16° C. and relative humidity of 20%",→the "environment of a temperature of 16° C. and relative humidity of 80% environment",→the "environment of a temperature of 26° C. and relative humidity of 80%",→the "environment of a temperature of 32° C. and relative humidity of 20%",→the "environment of a temperature of 32° C. and relative humidity of 55%". However, there is no limitation to this order. From the servo band spacing obtained after 1 year storage in each environment, the magnetic tape deformation amount after storage for 1 year in each environment was obtained by the method described above. The maximum value of the five magnetic tape deformation amounts obtained in the five environments was defined as the magnetic tape maximum deformation amount after storage in the five environments for 1 year.

Rate of Change in Magnetic Tape Deformation Amount with Respect to Change in Relative Humidity An inclination a obtained by the least squares method was obtained as the rate of change in the magnetic tape deformation amount with respect to the change in relative humidity by setting the magnetic tape deformation amount as y of a linear function of y=ax+b (a is an inclination and b is piece) and the relative humidity in the environment in which the magnetic tape deformation amount is obtained as x, regarding the values of the five magnetic tape deformation amounts obtained after storage in each of the five environments for 1 year.

Rate of Change in Magnetic Tape Deformation Amount with Respect to Change in Temperature An inclination c obtained by the least squares method was obtained as the rate of change in the magnetic tape deformation amount with respect to the change in temperature by setting the magnetic tape deformation amount as y of a linear function of y=cx+d (c is an inclination and d is piece) and the temperature in the environment in which the magnetic tape deformation amount is obtained as x, regarding the values of the five magnetic tape deformation amounts obtained after storage in each of the five environments for 1 year.

Tape Thickness

The magnetic tape cartridge after the evaluation was placed in an environment with a temperature of 20° C. to 25° C. and a relative humidity of 40% to 60% for 5 days or longer to make it familiar with the environment. Then, subsequently, in the same environment, 10 tape samples (length: 5 cm) were cut out from any part of the magnetic tape taken out from the magnetic tape cartridge, and these tape samples were stacked to measure the thickness. The thickness was measured using a digital thickness gauge of a Millimar 1240 compact amplifier manufactured by MARH and a Millimar 1301 induction probe. The value (thickness per tape sample) obtained by calculating 1/10 of the measured thickness was defined as the tape thickness. For each magnetic tape, the tape thickness was 5.6 μm.

Evaluation of Recording and Reproducing Performance (1) Recording of Data and Reproducing of Recorded Data on Magnetic Tape After Storage The recording and reproducing before storage were performed using the magnetic recording and reproducing device having the configuration shown in FIG. 1. The recording and reproducing head mounted on the recording and reproducing head unit has 32 or more channels of reproducing elements (reproducing element width: 0.8 μm) and recording elements, and servo signal reading and reproducing elements on both sides thereof.

For each magnetic tape cartridge, the environment for the recording and reproducing which will be described later was set to an environment in which the magnetic tape deformation amount was the maximum value among the five environments.

The magnetic tape cartridge was placed in the environment for performing the reproducing for 5 days to make it familiar with the environment for performing the recording. Then, in the same environment, the recording was performed as follows.

The magnetic tape cartridge was set in the magnetic recording and reproducing device and the magnetic tape was loaded. Next, while performing servo tracking, the recording and reproducing head unit records pseudo random data having a specific data pattern on the magnetic tape. The tension applied in the tape longitudinal direction at that time is a constant value of 0.50 N. At the same time with the recording of the data, the value of the servo band spacing of the entire tape length was measured every 1 m of the longitudinal position and recorded in the cartridge memory.

Next, while performing servo tracking, the recording and reproducing head unit reproduces the data recorded on the magnetic tape. At that time, the value of the servo band spacing was measured at the same time as the reproducing, and the tension applied in the tape longitudinal direction was changed so that an absolute value of a difference from the servo band spacing during the recording at the same longitudinal position approaches 0 based on the information recorded in the cartridge memory. During the reproducing, the measurement of the servo band spacing and the tension control based on it are continuously performed in real time. In a case of such reproducing, the tension applied in the longitudinal direction of the magnetic tape was changed in a range of 0.50 N to 0.85 N by the control device of the magnetic recording and reproducing device. Therefore, the maximum value of the tension applied in the longitudinal direction of the magnetic tape during the reproducing is 0.85 N.

At the end of the reproducing, the entire length of the magnetic tape was wound around the cartridge reel of the magnetic tape cartridge.

(2) Winding (Rewinding) Around Cartridge Reel and Storage

Subsequently, in the same environment, the magnetic tape was allowed to run in the magnetic recording and reproducing device and the entire length of the magnetic tape was wound around the winding reel of the magnetic recording and reproducing device. The tension applied in the longitudinal direction of the magnetic tape during the winding was set to a constant value of 0.40 N.

Then, tension was applied in the longitudinal direction of the magnetic tape at a constant value of 0.40 N, and the entire length of the magnetic tape was wound on the cartridge reel (also referred to as "rewinding").

After the rewinding, the magnetic tape cartridge accommodating the magnetic tape was stored in the order of the "environment of a temperature of 16° C. and relative humidity of 20%",→the "environment of a temperature of 16° C. and relative humidity of 80% environment",→the "environment of a temperature of 26° C. and relative humidity of 80%",→the "environment of a temperature of 32° C. and relative humidity of 20%",→the "environment of a temperature of 32° C. and relative humidity of 55%" for 1 year in each environment.

(3) Evaluation of Recording and Reproducing Performance After Storage

After the storage, the magnetic tape cartridge was placed in the environment in which the magnetic tape deformation amount was the maximum among the five environments described above for five days to make it familiar with the environment for performing the reproducing. Then, in the same environment, the reproducing was performed in the same manner as the reproducing before storage in the section (1). That is, the reproducing was performed by changing the tension applied in the longitudinal direction of the magnetic tape as described above.

The number of channels in the reproducing described above was 32 channels, and in the reproducing after the storage, in a case where the data of all 32 channels was correctly read, the recording and reproducing performance was evaluated as "4", in a case where the data of 31 channels or 30 channels was correctly read, the recording and reproducing performance was evaluated as "3", in a case where the data of 29 channels or 28 channels was correctly read, the recording and reproducing performance was evaluated as "2", and in other cases, the recording and reproducing performance was evaluated as "1".

Evaluation of Running Stability

Using each of the magnetic tape cartridges of the examples and the comparative examples, data recording and reproducing were performed using the magnetic recording and reproducing device having the configuration shown in FIG. 1. The recording and reproducing head mounted on the recording and reproducing head unit has 32 or more channels of reproducing elements (reproducing element width: 0.8 μm) and recording elements, and servo signal reading elements on both sides thereof.

The data was recorded and reproduced by the following method, and the running stability during the reproducing was evaluated.

The magnetic tape cartridge was set in the magnetic recording and reproducing device and the magnetic tape was loaded. Next, while performing servo tracking, the recording and reproducing head unit records pseudo random data having a specific data pattern on the magnetic tape. The tension applied in the tape longitudinal direction at that time is a constant value. At the same time with the recording of the data, the value of the servo band spacing of the entire tape length was measured every 1 m of the longitudinal position and recorded in the cartridge memory.

Next, while performing servo tracking, the recording and reproducing head unit reproduces the data recorded on the magnetic tape. At that time, the value of the servo band spacing was measured at the same time as the reproducing, and the tension applied in the tape longitudinal direction was controlled so that an absolute value of a difference from the servo band spacing during the recording at the same longitudinal position approaches 0 based on the information recorded in the cartridge memory. During the reproducing, the measurement of the servo band spacing and the tension control based on it are continuously performed in real time.

The running stability was evaluated using a standard deviation of a reading position PES (Position Error Signal) in the width direction based on the servo signal obtained by the servo signal reading element during the reproducing (hereinafter, referred to as "σPES") as an indicator.

PES is obtained by the following method.

In order to obtain the PES, the dimensions of the servo pattern are required. The standard of the dimension of the servo pattern varies depending on generation of LTO. Therefore, first, an average distance AC between the corresponding four stripes of the A burst and the C burst and an azimuth angle α of the servo pattern are measured using a magnetic force microscope or the like.

An average time between 5 stripes corresponding to the A burst and the B burst over the length of 1 LPOS word is defined as a. An average time between 4 stripes corresponding to the A burst and the C burst over the length of 1 LPOS word is defined as b. At this time, the value defined by AC×(1/2−a/b)/(2×tan(α)) represents a reading position PES (Position Error Signal) in the width direction based on the servo signal obtained by the servo signal reading element over the length of 1 LPOS word. Regarding the magnetic tape, an end on a side wound around a reel of the magnetic tape cartridge is referred to as an inner end, an end on the opposite side thereof is referred to as an outer end, the outer end is set to 0 m, and in a region in a tape length direction over a length of 30 m to 200 m, the standard deviation of PES (σPES) obtained by the method described above was calculated. In a case where the σPES is less than 70 nm, it can be determined that the running stability is excellent.

The result described above is shown in Table 1 (Tables 1-1 to 1-3).

TABLE 1

| | Unit | Example 1 | Example 2 | Example 3 | Example 4 | Example 5 | Example 6 | Example 7 |
|---|---|---|---|---|---|---|---|---|
| Kind of ferromagnetic powder | | BaFe | BaFe | BaFe | BaFe | BaFe | BaFe | BaFe |
| Kind of support | | PET | PET | PET | PET | PET | PET | PET |
| Moisture content of support | % | 0.6 | 0.6 | 0.6 | 0.6 | 0.6 | 0.6 | 0.4 |
| (a) Young's modulus in width direction of support | MPa | 6000 | 6000 | 6000 | 6000 | 6000 | 6000 | 6000 |
| (b) Young's modulus in longitudinal direction of support | MPa | 8000 | 8000 | 8000 | 8000 | 8000 | 8000 | 8000 |
| (b) − (a) | MPa | 2000 | 2000 | 2000 | 2000 | 2000 | 2000 | 2000 |
| Heat treatment temperature | °C. | 70° C. | 70° C. | 70° C. | 75° C. | 75° C. | 75° C. | 70° C. |
| Bending elastic modulus of reel hub material | GPa | 5 | 5 | 5 | 5 | 5 | 5 | 5 |
| Glass fiber content of reel hub material | % | 15 | 15 | 15 | 15 | 15 | 15 | 15 |
| Winding tension during manufacture | | 0.40N | 0.20N | 0.10N | 0.40N | 0.20N | 0.10N | 0.40N |
| Magnetic tape maximum deformation amount after storage in five environments for one year | μm | 0.50 μm | 0.45 μm | 0.30 μm | 0.40 μm | 0.35 μm | 0.20 μm | 0.30 μm |
| Rate of change in magnetic tape deformation amount with respect to change in temperature | μm/°C. | 0.1000 | 0.1000 | 0.1000 | 0.1000 | 0.1000 | 0.1000 | 0.0500 |
| Rate of change in magnetic tape deformation amount with respect to change in relative humidity | μm/% | 0.0500 | 0.0500 | 0.0500 | 0.0500 | 0.0500 | 0.0500 | 0.0100 |
| Recording and reproducing performance | | 3 | 3 | 3 | 3 | 3 | 3 | 3 |
| Running stability σPES | | 45 nm | 45 nm | 45 nm | 45 nm | 45 nm | 45 nm | 45 nm |

TABLE 1-continued

|  | Example 8 | Example 9 | Example 10 | Example 11 | Example 12 | Example 13 |
|---|---|---|---|---|---|---|
| Kind of ferromagnetic powder | BaFe | BaFe | BaFe | BaFe | BaFe | BaFe |
| Kind of support | PET | PET | PET | PET | PET | PEN |
| Moisture content of support | 0.4 | 0.2 | 0.2 | 0.1 | 0.1 | 0.7 |
| (a) Young's modulus in width direction of support | 6000 | 6000 | 6000 | 6000 | 6000 | 5000 |
| (b) Young's modulus in longitudinal direction of support | 8000 | 8000 | 8000 | 8000 | 8000 | 6000 |
| (b) − (a) | 2000 | 2000 | 2000 | 2000 | 2000 | 1000 |
| Heat treatment temperature | 75° C. | 70° C. | 75° C. | 70° C. | 75° C. | 70° C. |
| Bending elastic modulus of reel hub material | 5 | 5 | 5 | 8 | 8 | 5 |
| Glass fiber content of reel hub material | 15 | 15 | 15 | 30 | 30 | 15 |
| Winding tension during manufacture | 0.10N | 0.40N | 0.10N | 0.40N | 0.10N | 0.40N |
| Magnetic tape maximum deformation amount after storage in five environments for one year | 0.20 μm | 0.30 μm | 0.20 μm | 0.20 μm | 0.10 μm | 0.50 μm |
| Rate of change in magnetic tape deformation amount with respect to change in temperature | 0.0100 | 0.0100 | 0.0100 | 0.0010 | 0.0010 | 0.1000 |
| Rate of change in magnetic tape deformation amount with respect to change in relative humidity | 0.0050 | 0.0050 | 0.0050 | 0.0001 | 0.0001 | 0.0500 |
| Recording and reproducing performance | 3 | 3 | 3 | 3 | 4 | 3 |
| Running stability σPES | 45 nm | 45 nm | 45 nm | 45 nm | 45 nm | 45 nm |

|  | Unit | Example 14 | Example 15 | Example 16 | Example 17 | Example 18 | Example 19 | Example 20 |
|---|---|---|---|---|---|---|---|---|
| Kind of ferromagnetic powder |  | BaFe | BaFe | BaFe | BaFe | BaFe | BaFe | BaFe |
| Kind of support |  | PEN | PEN | PEN | PEN | PEN | PEN | PEN |
| Moisture content of support | % | 0.7 | 0.7 | 0.7 | 0.7 | 0.7 | 0.1 | 0.1 |
| (a) Young's modulus in width direction of support | MPa | 5000 | 5000 | 5000 | 5000 | 5000 | 5000 | 5000 |
| (b) Young's modulus in longitudinal direction of support | MPa | 6000 | 6000 | 6000 | 6000 | 6000 | 6000 | 6000 |
| (b) − (a) | MPa | 1000 | 1000 | 1000 | 1000 | 1000 | 1000 | 1000 |
| Heat treatment temperature | ° C. | 70° C. | 70° C. | 75° C. | 75° C. | 75° C. | 70° C. | 75° C. |
| Bending elastic modulus of reel hub material | GPa | 5 | 5 | 5 | 5 | 5 | 5 | 5 |
| Glass fiber content of reel hub material | % | 15 | 15 | 15 | 15 | 15 | 15 | 15 |
| Winding tension during manufacture |  | 0.20N | 0.10N | 0.40N | 0.20N | 0.10N | 0.40N | 0.10N |
| Magnetic tape maximum deformation amount after storage in five environments for one year | μm | 0.45 μm | 0.40 μm | 0.45 μm | 0.35 μm | 0.25 μm | 0.30 μm | 0.25 μm |
| Rate of change in magnetic tape deformation amount with respect to change in temperature | μm/° C. | 0.1000 | 0.1000 | 0.1000 | 0.1000 | 0.1000 | 0.0010 | 0.0010 |
| Rate of change in magnetic tape deformation amount with respect to change in relative humidity | μm/% | 0.0500 | 0.0500 | 0.0500 | 0.0500 | 0.0500 | 0.0001 | 0.0001 |
| Recording and reproducing performance |  | 3 | 3 | 3 | 3 | 3 | 3 | 3 |
| Running stability σPES |  | 45 nm | 45 nm | 45 nm | 45 nm | 45 nm | 45 nm | 45 nm |

TABLE 1-continued

| | Example 21 | Example 22 | Example 23 | Example 24 | Example 25 | Example 26 |
|---|---|---|---|---|---|---|
| Kind of ferromagnetic powder | BaFe | BaFe | BaFe | SrFe 1 | SrFe 2 | ε-Iron oxide |
| Kind of support | PEN | PEN | PA | PET | PET | PET |
| Moisture content of support | 0.1 | 0.1 | 2.0 | 0.6 | 0.6 | 0.6 |
| (a) Young's modulus in width direction of support | 5000 | 5000 | 10000 | 6000 | 6000 | 6000 |
| (b) Young's modulus in longitudinal direction of support | 6000 | 6000 | 12000 | 8000 | 8000 | 8000 |
| (b) − (a) | 1000 | 1000 | 2000 | 2000 | 2000 | 2000 |
| Heat treatment temperature | 70° C. | 75° C. | 70° C. | 70° C. | 70° C. | 70° C. |
| Bending elastic modulus of reel hub material | 8 | 8 | 8 | 5 | 5 | 5 |
| Glass fiber content of reel hub material | 30 | 30 | 30 | 15 | 15 | 15 |
| Winding tension during manufacture | 0.40N | 0.10N | 0.10N | 0.40N | 0.40N | 0.40N |
| Magnetic tape maximum deformation amount after storage in five environments for one year | 0.20 μm | 0.10 μm | 0.20 μm | 0.50 μm | 0.50 μm | 0.50 μm |
| Rate of change in magnetic tape deformation amount with respect to change in temperature | 0.0010 | 0.0010 | 0.0010 | 0.1000 | 0.1000 | 0.1000 |
| Rate of change in magnetic tape deformation amount with respect to change in relative humidity | 0.0001 | 0.0001 | 0.0001 | 0.0500 | 0.0500 | 0.0500 |
| Recording and reproducing performance | 3 | 4 | 3 | 3 | 3 | 3 |
| Running stability σPES | 45 nm | 45 nm | 45 nm | 45 nm | 45 nm | 45 nm |

| | Unit | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Kind of ferromagnetic powder | | BaFe | BaFe | BaFe | BaFe | BaFe | BaFe | BaFe |
| Kind of support | | PET | PET | PET | PEN | PEN | PEN | PET |
| Moisture content of support | % | 1.2 | 0.8 | 0.1 | 1.5 | 1.0 | 0.1 | 0.8 |
| (a) Young's modulus in width direction of support | MPa | 6000 | 6000 | 6000 | 5000 | 5000 | 5000 | 3000 |
| (b) Young's modulus in longitudinal direction of support | MPa | 8000 | 8000 | 8000 | 6000 | 6000 | 6000 | 4000 |
| (b) − (a) | MPa | 2000 | 2000 | 2000 | 1000 | 1000 | 1000 | 1000 |
| Heat treatment temperature | ° C. | | | | | | | |
| Bending elastic modulus of reel hub material | GPa | 3 | 3 | 3 | 3 | 3 | 3 | 3 |
| Glass fiber content of reel hub material | % | 10 | 10 | 10 | 10 | 10 | 10 | 10 |
| Winding tension during manufacture | | 0.50N | 0.50N | 0.50N | 0.50N | 0.50N | 0.50N | 0.50N |
| Magnetic tape maximum deformation amount after storage in five environments for one year | μm | 1.00 μm | 0.80 μm | 0.55 μm | 1.20 μm | 1.00 μm | 0.60 μm | 0.80 μm |
| Rate of change in magnetic tape deformation amount with respect to change in temperature | μm/° C. | 0.3000 | 0.2000 | 0.2000 | 0.3000 | 0.2000 | 0.2000 | 0.2500 |
| Rate of change in magnetic tape deformation amount with respect to change in relative humidity | μm/% | 0.2000 | 0.1500 | 0.1000 | 0.2000 | 0.1500 | 0.1000 | 0.2000 |
| Recording and reproducing performance | | 1 | 1 | 1 | 1 | 1 | 1 | 1 |
| Running stability σPES | | 75 nm | 75 nm | 75 nm | 75 nm | 75 nm | 75 nm | 75 nm |

TABLE 1-continued

|  | | Comparative Example 8 | Comparative Example 9 | Comparative Example 10 | Comparative Example 11 |
|---|---|---|---|---|---|
| | Kind of ferromagnetic powder | BaFe | BaFe | BaFe | BaFe |
| | Kind of support | PET | PEN | PET | PET |
| | Moisture content of support | 0.8 | 1.0 | 0.1 | 0.1 |
| | (a) Young's modulus in width direction of support | 4000 | 3000 | 6000 | 6000 |
| | (b) Young's modulus in longitudinal direction of support | 4500 | 4000 | 8000 | 8000 |
| | (b) − (a) | 500 | 1000 | 2000 | 2000 |
| | Heat treatment temperature | | | 80° C. | 85° C. |
| | Bending elastic modulus of reel hub material | 3 | 3 | 3 | 3 |
| | Glass fiber content of reel hub material | 10 | 10 | 10 | 10 |
| | Winding tension during manufacture | 0.50N | 0.50N | 0.50N | 0.50N |
| | Magnetic tape maximum deformation amount after storage in five environments for one year | 0.80 μm | 0.90 μm | 0.50 μm | 0.50 μm |
| | Rate of change in magnetic tape deformation amount with respect to change in temperature | 0.2500 | 0.2500 | 0.0005 | 0.0010 |
| | Rate of change in magnetic tape deformation amount with respect to change in relative humidity | 0.2000 | 0.2000 | 0.0001 | 0.00001 |
| | Recording and reproducing performance | 1 | 1 | 3 | 3 |
| | Running stability σPES | 75 nm | 75 nm | 75 nm | 75 nm |

Regarding the magnetic tape cartridge of Example 1, the recording and reproducing performance was evaluated by the method described above, except that the rewinding tension for winding around the cartridge reel was changed from 0.40 N to 0.50 N in the evaluation of the recording and reproducing performance, and the evaluation result was "2".

A magnetic tape cartridge was manufactured by the method described above as in Example 1 except that the homeotropic alignment process was not performed in a case of manufacturing the magnetic tape.

A sample piece was cut out from the magnetic tape taken out from the magnetic tape cartridge. For this sample piece, a vertical squareness ratio was obtained by the method described above using a TM-TRVSM5050-SMSL type manufactured by Tamagawa Seisakusho Co., Ltd. as an oscillation sample type magnetic-flux meter and it was 0.55.

The magnetic tape was also taken out from the magnetic tape cartridge of Example 1, and the vertical squareness ratio was obtained in the same manner for the sample piece cut out from the magnetic tape, and it was 0.60.

The magnetic tapes taken out from the above two magnetic tape cartridges were attached to each of the ½-inch reel testers, and the electromagnetic conversion characteristics (signal-to-noise ratio (SNR)) were evaluated by the following methods. As a result, regarding the magnetic tape taken out from the magnetic tape cartridge of Example 1, a value of SNR 2 dB higher than that of the magnetic tape manufactured without the homeotropic alignment process was obtained.

In an environment of a temperature of 23° C. and a relative humidity of 50%, a tension of 0.7 N was applied in the longitudinal direction of the magnetic tape, and recording and reproduction were performed for 10 passes. A relative speed of the magnetic head and the magnetic tape was set as 6 msec. The recording was performed by using a metal-in-gap (MIG) head (gap length of 0.15 μm, track width of 1.0 μm) as the recording head and by setting a recording current as an optimal recording current of each magnetic tape. The reproduction was performed using a giant-magnetoresistive (GMR) head (element thickness of 15 nm, shield interval of 0.1 μm, reproducing element width of 0.8 μm) as the reproduction head. A signal having a linear recording density of 300 kfci was recorded, and the reproduced signal was measured with a spectrum analyzer manufactured by ShibaSoku Co., Ltd. In addition, the unit kfci is a unit of linear recording density (cannot be converted to SI unit system). As the signal, a sufficiently stabilized portion of the signal after starting the running of the magnetic tape was used.

One embodiment of the invention is advantageous in a technical field of various data storages such as archives.

What is claimed is:

1. A magnetic tape cartridge comprising:
   a magnetic tape which is wound around a cartridge reel and accommodated in the magnetic tape cartridge,
   wherein the magnetic tape includes a non-magnetic support, and a magnetic layer containing a ferromagnetic powder,
   the magnetic layer includes a plurality of servo bands,
   a maximum value of the following five magnetic tape deformation amounts of
   a magnetic tape deformation amount after storage for 1 year in an environment of a temperature of 16° C. and relative humidity of 20%,
   a magnetic tape deformation amount after storage for 1 year in an environment of a temperature of 16° C. and relative humidity of 80%,
   a magnetic tape deformation amount after storage for 1 year in an environment of a temperature of 26° C. and relative humidity of 80%, a magnetic tape deformation amount after storage for 1 year in an environment of a temperature of 32° C. and relative humidity of 20%, and a magnetic tape deformation amount after storage for 1 year in an environment of a temperature of 32° C. and relative humidity of 55% is 0.50 µm or less, a rate of a change in magnetic tape deformation amount with respect to a change in relative humidity, which is obtained from the five magnetic tape deformation amounts, is 0.0001 µm/% to 0.0500 µm/%, a rate of a change in magnetic tape deformation amount with respect to a change in temperature, which is obtained from the five magnetic tape deformation amounts, is 0.0010 µm/° C. to 0.1000 µm/° C., and a standard deviation of a position error signal denoted as σPES is 45 nm to 70 nm.

2. The magnetic tape cartridge according to claim 1,
wherein the maximum value of the five magnetic tape deformation amounts is 0.01 µm to 0.50 µm.

3. The magnetic tape cartridge according to claim 1,
wherein the magnetic tape further includes a non-magnetic layer containing a non-magnetic powder between the non-magnetic support and the magnetic layer.

4. The magnetic tape cartridge according to claim 1,
wherein the magnetic tape further includes a back coating layer containing a non-magnetic powder, on a surface side of the non-magnetic support opposite to a surface side provided with the magnetic layer.

5. The magnetic tape cartridge according to claim 1,
wherein the non-magnetic support is an aromatic polyester support.

6. The magnetic tape cartridge according to claim 5,
wherein the aromatic polyester support is a polyethylene terephthalate support.

7. The magnetic tape cartridge according to claim 5,
wherein the aromatic polyester support is a polyethylene naphthalate support.

8. The magnetic tape cartridge according to claim 1,
wherein the non-magnetic support is an aromatic polyamide support.

9. The magnetic tape cartridge according to claim 1,
wherein a vertical squareness ratio of the magnetic tape is 0.60 or more.

10. A magnetic recording and reproducing device comprising:
the magnetic tape cartridge according to claim 1.

11. The magnetic recording and reproducing device according to claim 10, further comprising:
a magnetic head having a reproducing element width of 0.8 µm or less.

12. The magnetic recording and reproducing device according to claim 10, further comprising:
the magnetic tape cartridge; and
a winding reel,
wherein the magnetic tape is caused to run between the winding reel and a cartridge reel of the magnetic tape cartridge in a state where a tension is applied in a longitudinal direction of the magnetic tape, where a maximum value of the tension is 0.50 N or more, and
the magnetic tape after running in the state where the tension is applied is wound around the cartridge reel of the magnetic tape cartridge by applying a tension of 0.40 N or less in the longitudinal direction of the magnetic tape.

13. The magnetic recording and reproducing device according to claim 10,
wherein the maximum value of the five magnetic tape deformation amounts is 0.01 µm to 0.50 µm.

14. The magnetic recording and reproducing device according to claim 10,
wherein the magnetic tape further includes a non-magnetic layer containing a non-magnetic powder between the non-magnetic support and the magnetic layer.

15. The magnetic recording and reproducing device according to claim 10,
wherein the magnetic tape further includes a back coating layer containing a non-magnetic powder, on a surface side of the non-magnetic support opposite to a surface side provided with the magnetic layer.

16. The magnetic recording and reproducing device according to claim 10,
wherein the non-magnetic support is an aromatic polyester support.

17. The magnetic recording and reproducing device according to claim 16,
wherein the aromatic polyester support is a polyethylene terephthalate support.

18. The magnetic recording and reproducing device according to claim 16,
wherein the aromatic polyester support is a polyethylene naphthalate support.

19. The magnetic recording and reproducing device according to claim 10,
wherein the non-magnetic support is an aromatic polyamide support.

20. The magnetic recording and reproducing device according to claim 10,
wherein a vertical squareness ratio of the magnetic tape is 0.60 or more.

* * * * *